US005913375A

United States Patent [19]
Nishikawa

[11] Patent Number: 5,913,375
[45] Date of Patent: Jun. 22, 1999

[54] VEHICLE STEERING FORCE CORRECTION SYSTEM

[75] Inventor: Masao Nishikawa, Saitama, Japan

[73] Assignee: Honda Giken Kogyo Kabushiki Kaisha, Tokyo, Japan

[21] Appl. No.: 08/705,219

[22] Filed: Aug. 29, 1996

[30] Foreign Application Priority Data

Aug. 31, 1995 [JP] Japan ................................ 7-246902

[51] Int. Cl.$^6$ .................................................. B60T 7/16
[52] U.S. Cl. ..................... 180/168; 180/167; 318/580; 701/28
[58] Field of Search ................................ 180/167, 168, 180/169, 131; 250/202, 203.1; 356/435, 442; 701/23, 26, 28; 318/580, 587

[56] References Cited

U.S. PATENT DOCUMENTS

| 5,350,912 | 9/1994 | Ishida | 250/202 |
|---|---|---|---|
| 5,521,579 | 5/1996 | Bernhard | 180/167 |
| 5,629,595 | 5/1997 | Salter | 180/168 |
| 5,659,304 | 8/1997 | Chakraborty | 180/167 |

FOREIGN PATENT DOCUMENTS

| 5411171 | 5/1979 | Japan | B62D 5/06 |
|---|---|---|---|
| 6210871 | 3/1987 | Japan | B62B 5/08 |
| 316879 | 1/1991 | Japan | B62D 6/02 |
| 4019274 | 1/1992 | Japan | B62D 6/00 |
| 5197423 | 6/1993 | Japan | G05D 1/02 |
| 781604 | 3/1995 | Japan | B62D 6/00 |

OTHER PUBLICATIONS

Abstracts in English of each Japanese Publication identified above.

*Primary Examiner*—Peter M. Poon
*Assistant Examiner*—C. T. Bartz
*Attorney, Agent, or Firm*—Lyon & Lyon LLP

[57] ABSTRACT

A system for correcting the steering force of a vehicle having a steering wheel whose rotary motion exerted by a vehicle driver is converted into a turn motion of the steering wheels of the vehicle through a steering mechanism. The system is provided with sensors including a CCD camera for detecting the condition of the road ahead having at least one traffic lane on which the vehicle is traveling and a position of the vehicle with respect to the traffic lane. In the system the desired steering force is determined to be generated by the steering mechanism necessary for keeping the detected position of the vehicle with respect to the traffic lane based on the detected parameter and the steering mechanism is biased such that the steering mechanism generates the desired steering force. Conditions on the next adjacent lanes are monitored and the degree of danger is estimated to determine the biasing force. The system can be realized on muscular-energy steering systems or power-assisted steering systems.

38 Claims, 23 Drawing Sheets

VEHICLE STEERING FORCE CORRECTION SYSTEM

BACKGROUND OF THE INVENTION

1. Field of the Invention

This invention relates to a system for correcting the steering force of a vehicle.

2. Description of the Related Art

It has been known in the art to correct the steering force of a vehicle. For example, Japanese Laid-Open Patent Application Hei 3(1991)-16879 discloses a system which estimates that the tire would slip on the road, when the detected yaw rate about the vehicle yaw axis is found to be beyond the value that must be generated by the steering behavior at that time, and drives the steering mechanism to generate the steering reaction force such that the steering behavior will correspond to that produced by the detected yaw rate.

Whether the yaw rate or some similar parameters such as the lateral gravity G (exerted laterally on the vehicle) is used as a parameter for monitoring, the prior art system is based on the concept of feedback control in which the steering angle manipulated by the vehicle driver is monitored as to whether the steering force is properly generated, and if not, the vehicle driver is suggested to correct steering. In general, the feedback control becomes effective after an error between the manipulated variable and controlled variable has occurred. Thus, the feedback control is useful as a symptomatic therapy, but is accordingly useless in avoiding the occurrence of an error beforehand.

Various sensors or detectors have been developed in recent years based on the advanced computer technology which can monitor the current vehicle running condition accurately. It therefore becomes possible to detect not only the parameter such as the lateral gravity G, but also it is possible to detect the deviation of the vehicle, through image processing, from the traffic lane on which the vehicle is traveling. It further becomes possible to monitor, by an ultrasonic sensor or a radar, as to whether another vehicle is closing in from behind on another lane. It has therefore been proposed in Japanese Laid-Open Patent Application Hei 4(1992)-19274 to predict a collision of vehicles if the driver changes the traffic lane to another.

The prior art system disclosed in the publication of 4-19274 is configured to do nothing more than simply decrease the amount of power-assist if the vehicle driver intends to steer the vehicle in a direction in which another vehicle exists. Specifically, the prior art system is unable to correct the steering force. More specifically, the prior art system is not configured to predict a future vehicle behavior or condition from the current vehicle running condition and to correct the steering force to a proper value such that the future vehicle behavior or condition will be equal to the behavior that the driver expects, or which provides information, as as the steering force, to the driver concerning the dangerousness which would otherwise occur based on a sign that the driver overlooked.

An object of the invention is to provide a system for correcting the steering force of a vehicle, which predicts a future vehicle behavior or condition from the current vehicle running condition and to correct the steering force to a proper value based on the concept of feedforward control such that the future vehicle behavior or condition will be equal to the behavior that the driver expects, and which provides information, in terms of steering, to the driver concerning the dangerousness which would otherwise occur based on a sign that the driver overlooked.

Moreover, there will be a situation in which, after having predicted a future vehicle condition or behavior, that to steer right, for example, may be safer than keeping the straight-ahead steering. If that is true, it will accordingly be favorable to provide the information to the driver by increasing the steering force (steering wheel torque or steering wheel actuating force) in the right direction or by decreasing that in the opposite direction.

Another object of the invention is therefore to provide a system for correcting the steering force of a vehicle, which predicts a future vehicle condition or behavior and based thereon, to provide the predicted information to the driver by making the steering force different in the right and left directions.

Furthermore, when, after having predicted a future vehicle condition or behavior, that to steer right, for example, may be safer than keeping the straight-ahead steering, it is favorable to positively invite the driver to steer right to avoid an accident, rather than simply suggesting it to him by decreasing the steering force in the right direction.

Yet another object of the invention is therefore to provide a system for correcting the steering force of a vehicle, which predicts a future vehicle condition or behavior and to positively invite the driver to carry out an accident avoiding operation, if needed.

Aside from the above, the invention is applicable not only to a vehicle equipped with power-assisted steering or power steering, but also to a vehicle equipped with muscular-energy steering. However, it is more advantageous if the system is applied to a vehicle equipped with power-assisted steering or power steering, since the system can be simpler and smaller in structure.

In the vehicle equipped with the power-assisted steering or power steering, it has been proposed to decrease the amount of power-assist to intensify the steering force (steering wheel actuating force or steering wheel torque). For example, it is known to increase the steering force by relieving pressurized oil supplied by a pump to an oil reservoir through a solenoid valve in the vehicle-speed-responsive-power-steering system. It is similarly known as taught in Japanese Patent Publication Sho 54(1979)-11171 to intensify the steering force by raising oil pressure in the reaction chamber. However, these prior art systems are configured to intensify the steering force in the right and left directions to an equal extent. Specifically, these prior art systems aim to prevent the occurrence of excessive steering than intended at a high vehicle speed.

In a vehicle equipped with the power-assisted steering or power steering, when it is estimated to be dangerous to, for example, steer right, it will accordingly be favorable to decrease the amount of power assist in the right direction so as to increase the steering force (steering wheel actuating force) in the same direction. On the other hand, when steering right is predicted to be safer, it will be favorable to increase the amount of power-assist in the right direction to decrease the steering force in the same direction. When configured thus, the driver will be invited or suggested to correct the steering in the right direction. Needless to say, it can be configured to apply a power as the steering force, independently of the driver's steering, to positively invite him to take an accident avoiding behavior.

A fourth object of the invention is therefore to provide a system for correcting the steering force of a vehicle equipped with power-assisted steering or power steering, which makes the steering force different in the right and left directions by increasing/decreasing the amount of power assist, or which causes the driver to take any accident avoiding behavior.

Even in the situations mentioned above, the driver must, of course, be free in steering the vehicle to run straight-ahead or turn left or right at his discretion. This is because the driver will not always overlook a curve or an obstacle ahead. Rather he might have an intention to divert from the road before the curve, or have a plan to stop before the obstacle or avoid it and then to stop.

A fifth object of the invention is therefore to provide a system for correcting the steering force of a vehicle, in which the driver can override the steering force corrected by the system, when the corrected steering force is inconsistent with his judgment.

Furthermore, there may be a situation in which, after having predicted a future vehicle condition or behavior, not to steer right or left would be better.

For example, there may be a situation in which other vehicles are about to pass or overtake in the right and left traffic lanes and in addition, there is found an obstacle ahead on the traffic lane on which the own vehicle is travelling. In this situation, it is favorable to increase or intensify the steering force in the right and left directions so as the to invite or suggest the driver to continue the straight-ahead driving or at least to keep the current traffic lane.

A sixth object of the invention is therefore to provide a system for correcting the steering force of a vehicle, which, when it is judged that to steer right or left is estimated to be not favorable, can increase or intensify the steering force in the right and left directions in response to the degree of judgement.

Moreover, in a vehicle equipped with the power-assist steering or power steering, if the steering force is only changed by increasing or decreasing the amount of power, the maximum steering force will theoretically be equal to that of the muscular-energy steering. In its minimum steering force, the road surface resistance will merely be decreased to zero such that the steering wheel can be moved by the driver's little finger. The system reliability will further be enhanced when, assuming that the driver is unable to steer the vehicle properly such as when dosing, it will be favorable to configure the system such that it recognizes the situation and operates to positively steer the vehicle.

With this respect, there has been proposed a system to automatically steer a vehicle which guides the vehicle to run along a desired travelling course. The automatically steered vehicle will be designed such that a human being (the driver) entrusts the system to steer during driving when a condition is satisfied. However, in the systems mentioned earlier there is not such a kind of automatic steering, because there has not been proposed an appropriate technique how to design it.

If a system can select an optimal traveling course in a traffic lane based on the detected current condition ahead of the vehicle, operate to steer the vehicle along the course and suggest to the driver how to steer in terms of steering force, the driver can recognize the direction to be steered by finding a direction with his hands in which the steering force is smaller and can steer the vehicle to easily run along the course. Such a kind of system acting as a good interface with a human being (the driver) has not been proposed.

In such a kind of system, if the system makes the steering force great such that the vehicle runs along a traffic lane, the vehicle can run along the course automatically even when the driver releases the steering wheel. Thus, by changing the degree of participation of the system in an analog manner, it becomes possible to continually alter the system from the state in which the vehicle is steered in cooperation with a human being to the state in which the vehicle is steered automatically. It becomes thus possible to design the system keeping pace with the development in the technology such as the environment recognition.

A seventh object of the invention is therefore to provide a system for correcting the steering force of a vehicle, which determines the amount of steering force optimal for causing the vehicle to run along a traffic lane when the driver is manipulating the steering wheel and provides information to him in terms of steering force such that he can easily steer the vehicle along the traffic lane, thereby making it possible for the system to coexist with a human being.

An eighth object of the invention is to provide a system for correcting the steering force of a vehicle, which can continually alter the degree of the human being's participation in vehicle steering, and although depending on the determination of control parameters, which will make it possible to realize automatic steering in which a human being does no longer participate in vehicle steering.

Furthermore, reviewing the aforesaid prior art (3-16879) carefully, it will easily be understood that the invention can not be realized on the mechanism disclosed there. The reason is that, since most of the power-assisted steering or power steering including that disclosed in the prior art reference adopts the so-called open center principle so as to save energy, the oil pressure for producing a bias force is not generated unless the steering wheel has been moved. In addition, although the rotary motion of steering generates the oil pressure and as a result, although it seems to be possible, at first view, to obtain the bias force as desired, we can not neglect the fact that the oil pressure varies with the reaction force from the road surface. Thus, the fact that the oil pressure to be generated is not constant makes the bias force unstable, requiring additional technique for stabilizing the oil pressure.

The prior art reference disclosed in its second embodiment, instead of the unstable hydraulic pressure, that electric force is used as an independent power-assist energy source. This will make it possible to determine the bias force with high accuracy.

However, the prior art system disclosed in the second embodiment has the following drawbacks.

(1) Since the mechanism for generating the bias force is housed in a rotating member, it is necessary to use slip rings which are poor in reliability.

(2) Since the mechanisms for generating electromagnetic force is exposed in oil, the magnetic force attracts dust or rubbish in the oil, degrading the operation.

The prior art system thus leaves much to be improved.

A ninth object of the invention is therefore to provide a system for correcting the steering force of a vehicle, which is compact, easily manufactured and reliable in operation.

Apart from the above, it is preferable for the system to be urged to the neutral point (straight-ahead position) at the time of initiating the system.

A tenth object of the invention is to provide a system for correcting the steering force of a vehicle which can easily obtain the neutral point (straight-ahead position) at the time of initiating the system.

SUMMARY OF THE INVENTION

In order to achieve the foregoing objects of this invention, there is provided in one aspect of the invention, a system for correcting a steering force of a vehicle having a steering wheel whose rotary motion exerted by a vehicle driver is converted into a turn motion of steered wheels of the vehicle through a steering mechanism, comprising road condition detecting means mounted on the vehicle for detecting a condition of a road ahead having at least one traffic lane on which the vehicle is traveling; position detecting means for detecting a position of the vehicle with respect to the traffic lane based at least on an output of the road condition detecting means; steering force determining means for determining a desired steering force to be generated by the steering mechanism necessary for keeping a desired position of the vehicle with respect to the traffic lane determined based at least on an output of the position detecting means; and biasing means for biasing the steering mechanism such that the steering mechanism generates the desired steering force determined by the steering force determining means.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
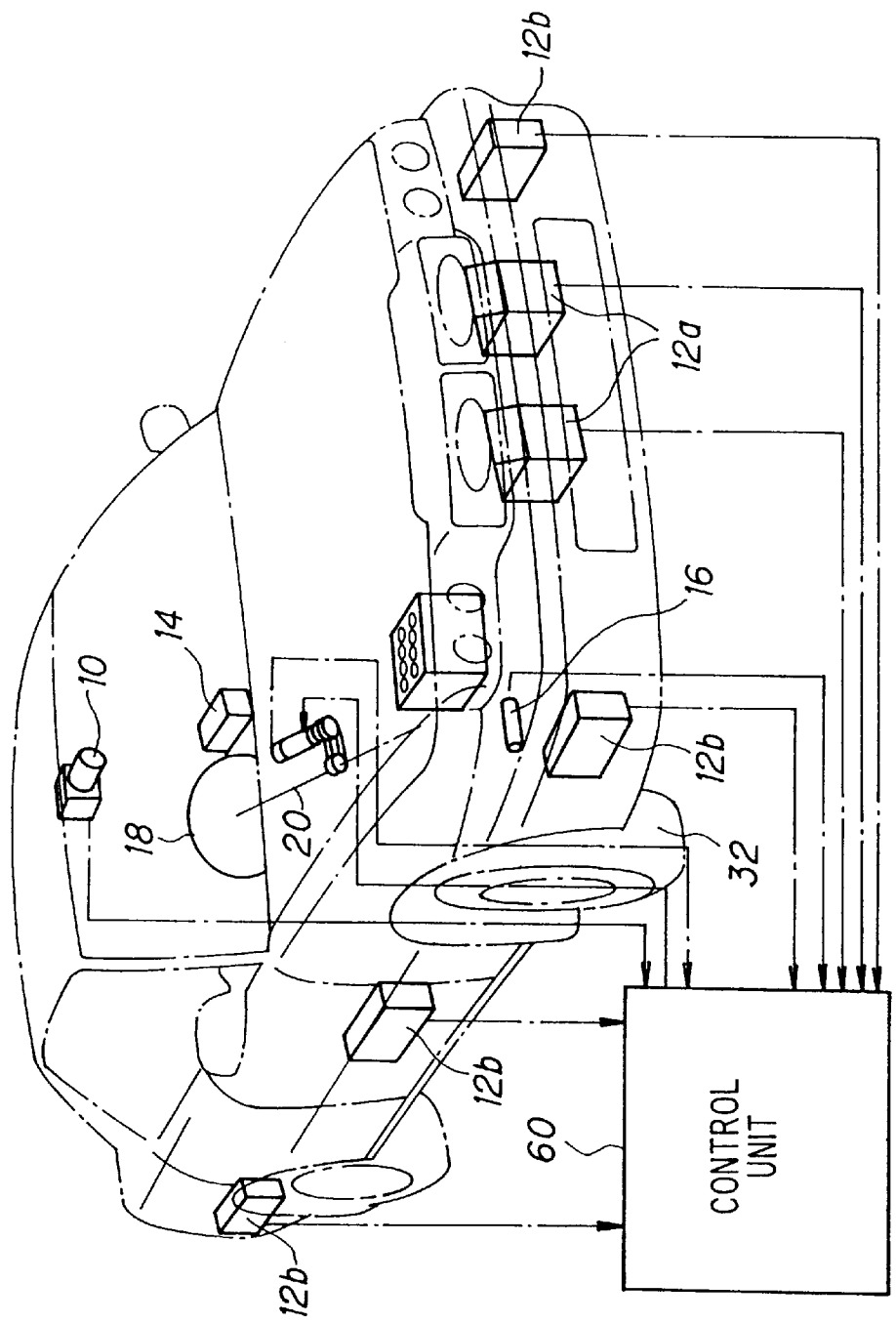
FIG. 1 is an overall schematic view showing the system for correcting the steering force of a vehicle according to the invention.

FIG. 1 is an overall perspective view of the system for correcting the steering force of a vehicle according to the invention.

As shown in the figure, the system is equipped with an image sensor such as a CCD (charge-coupled device) monochrome TV camera 10, which is mounted above the driver's seat in the vicinity of the rearview mirror to capture a monocular view of the road including traffic lanes ahead. Reference numerals 12a and 12b indicate a millimeter-wave radar system, collectively referred to as 12, using beamed and reflected radio frequency energy for detecting the presence of obstacles including other vehicles. The radar system 12 comprises of two front radars 12a mounted at the front of the vehicle, and six side and back radars 12b (back radars not shown) mounted at the side and back of the vehicle.

A yaw rate sensor 14 is mounted near the center of the gravity of the vehicle for detecting the yaw rate (angular velocity) of the vehicle around the yaw axis (z-axis). In addition, a vehicle speed sensor 16 constituted as a reed switch is mounted in the vicinity of the vehicle drive shaft (not shown) for detecting the vehicle travel speed.

Figure 2:
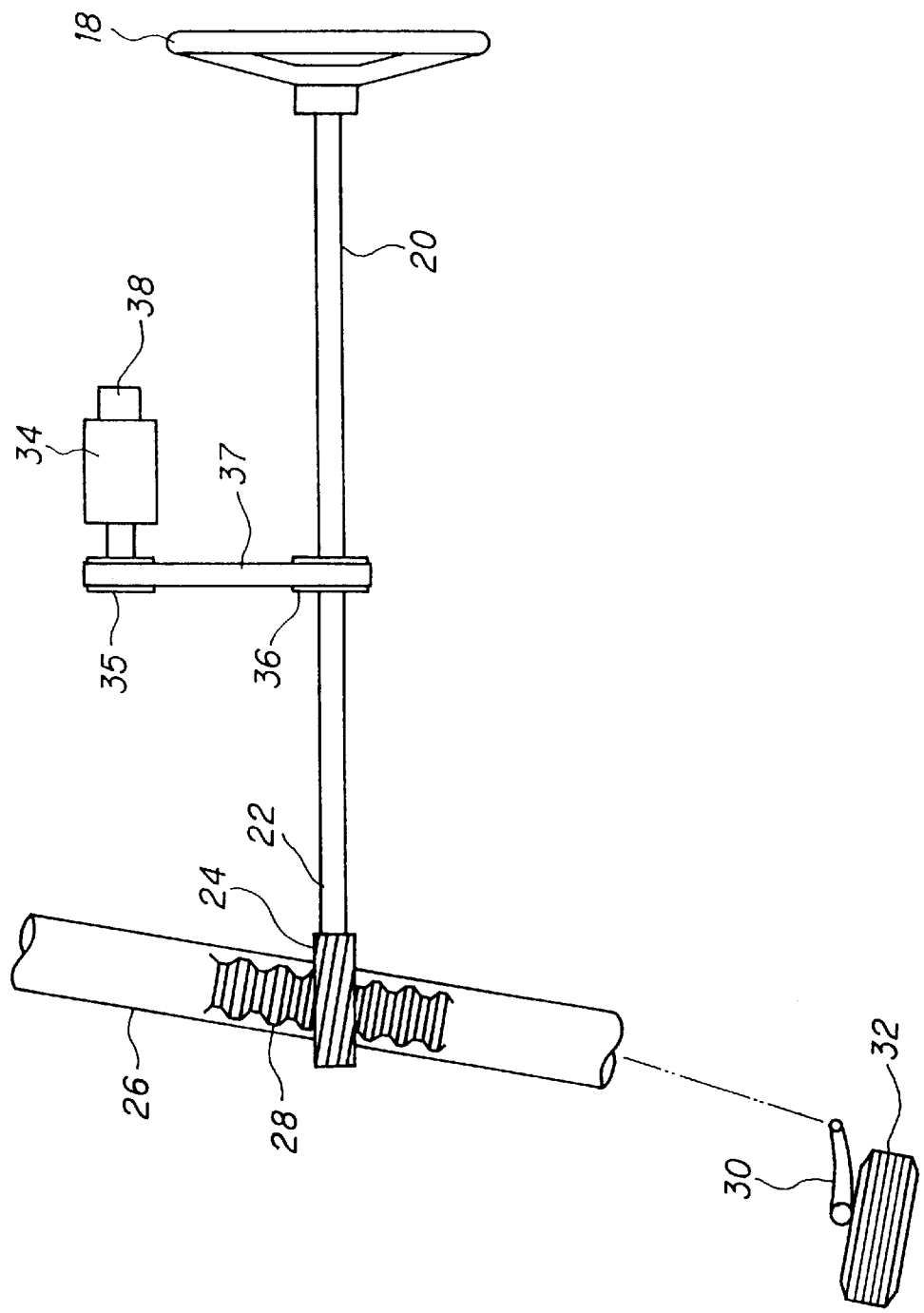
FIG. 2 is an explanatory plan view schematically showing a steering mechanism used in the system illustrated in FIG. 1.

As is best shown in FIG. 2, a steering mechanism has a steering wheel 18 and a steering shaft (column shaft) 20 connected thereto. The steering shaft 20 is integrally connected with a pinion shaft 22 at the opposite end. The pinion shaft 22 is formed with a pinion gear 24 at its free end which is meshed with a toothed rack 28 formed on a rack shaft or rack 26 such that a pinion revolution is translated to rack travel. The rack shaft 26 is mechanically connected, via tie rods (not shown) and knuckles 30, etc., with steered wheels 32 (only one shown). The steering mechanism converts the steering wheel rotary motion into a turn motion of the steered wheels 32 of the vehicle.

An electric motor 34, hereinafter referred to as the bias motor or the biasing means, is provided in the vicinity of the steering shaft 20. The motor output is transmitted, through pulleys 35, 36 and a drive belt 37, to the steering shaft 20 to rotate the pinion shaft 22 to generate a steering force. The bias motor 34 is provided with a rotary encoder 38 that detects the input steering angle through the amount of rotation of the bias motor 34.

In FIG. 1, outputs of the sensors, CCD camera and radars are sent to a control unit 60.

Figure 3:
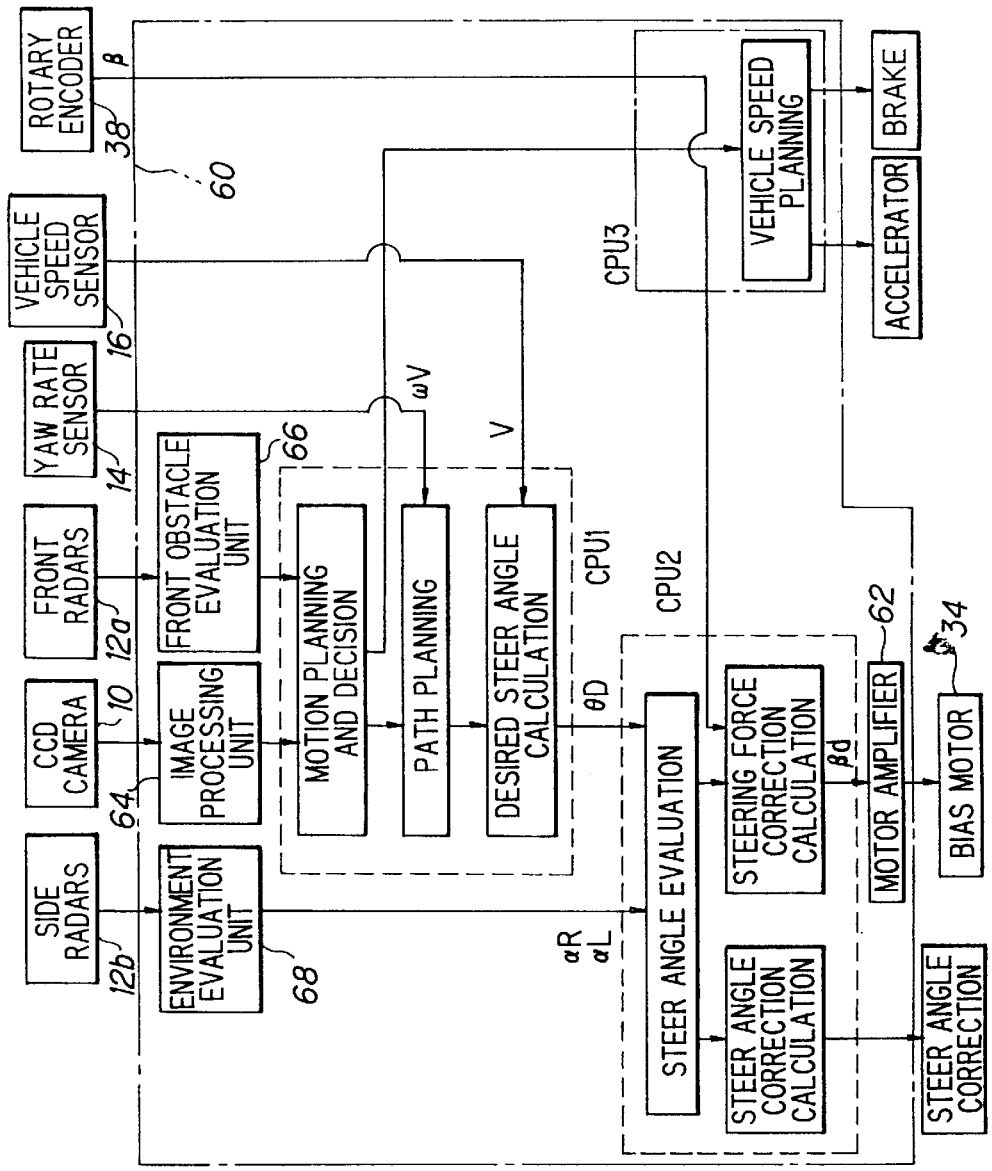
FIG. 3 is a block diagram showing the details of a control unit illustrated in FIG. 1.

FIG. 3 illustrates the control unit 60 in detail.

As illustrated, the control unit 60 has three microprocessors comprising of CPU 1, CPU 2 and CPU 3. The bias motor 34 is supplied with current from a motor amplifier 62 under the control of the CPU 2. The bias motor 34 may have a speed reducer that amplifies motor torque.

The outputs of the CCD camera 10 is input to an image processing unit 64 which calculates and processes the input data to detect the condition on the road before the vehicle. The outputs of the front radar 12a are input to a front obstacle evaluation unit 66 which calculates and processes the input data to obtain the positional information on an obstacle, if any, present before the vehicle. The outputs of the image processing unit 64 and the front obstacle evaluation unit 66 are sent to the CPU 1. Similarly, the outputs of the yaw rate sensor 14 and the vehicle speed sensor 16 are input to the CPU 1 via a respective preprocessing circuit (not shown). Based on the input data, the CPU 1 carries out a motion planning and decision, determines the desired path and the desired steer angle θD, and then outputs signals to the CPU 2.

Since, however, the details of the determination of the desired steer angle is described in detail in Japanese Laid-Open Patent Applications Hei 5(1993)-197423 (which was filed in the United States and patented under the number of U.S. Pat. No. 5,350,912) and Hei 7(1995)-81604 both proposed by the assignee, the determination will be only briefly explained in the following. It should be noted that the technique is basically based on the premise that the vehicle is running on a road such as a high way where traffic lanes are defined by lane markers (usually by white lines).

Figure 4:
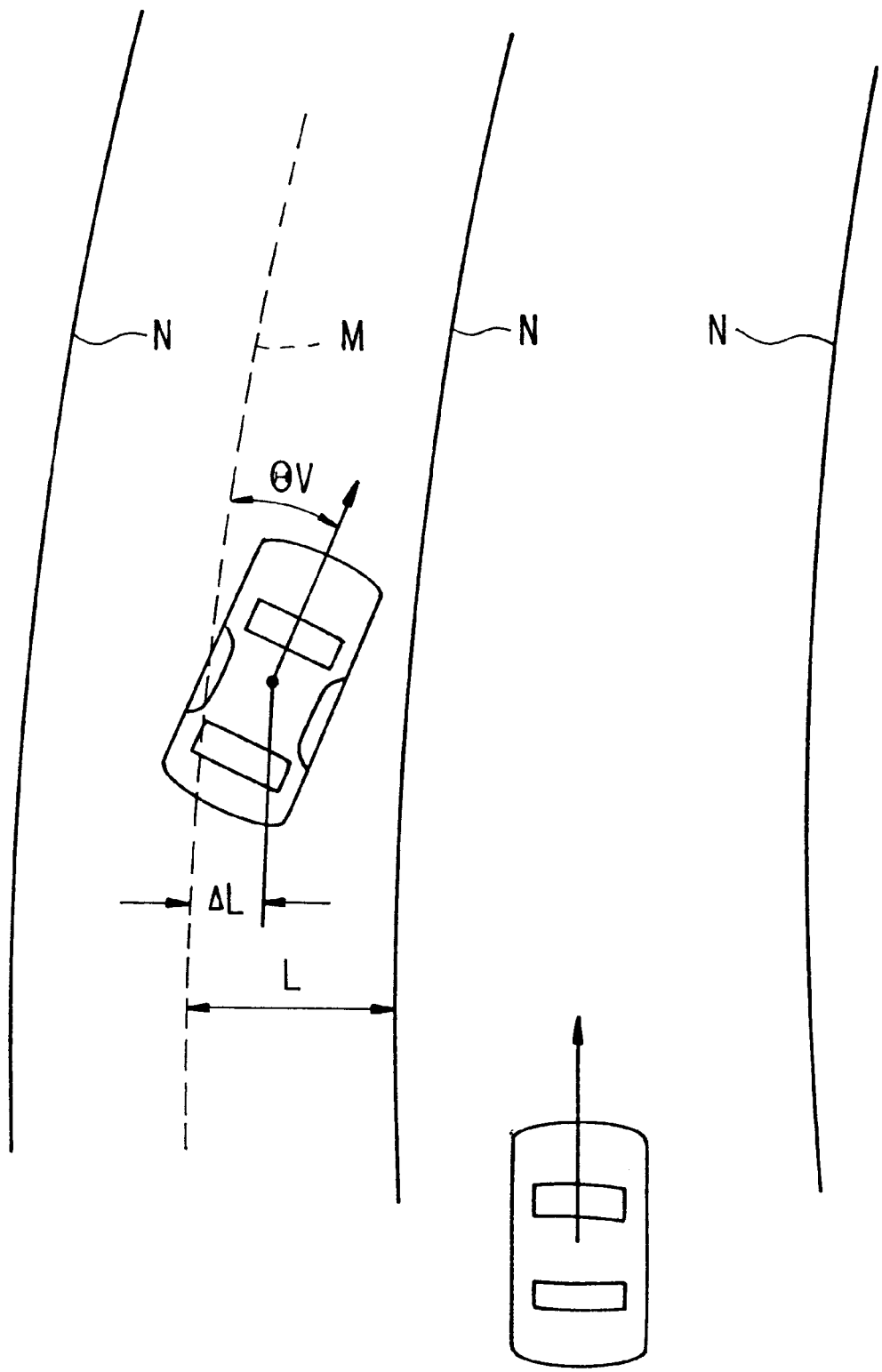
FIG. 4 is an explanatory view showing parameters calculated by the control unit illustrated in FIG. 3.

In the technique proposed earlier, the CPU 1 firstly determines the desired path. Specifically, as illustrated in FIG. 4, the desired path is a reference line M, (depicted by dashed lines in the figure) imaginarily drawn at the center of a traffic lane defined by lane markers N. Then, the CPU 1 calculates a desired point on the desired path M and an initial yaw rate necessary for the vehicle to reach the desired point. Then, the CPU 1 calculates the direction in which the vehicle should move and the angular difference between the direction and the desired path, and calculates the yaw rate correction for decreasing the angular difference. Finally, the CPU 1 determines the desired yaw rate by correcting the initial desired yaw rate by the yaw rate correction, and determines the aforesaid desired steer angle θD such that the desired yaw rate will be generated.

At the same time, the CPU 1 determines the deviation ΔL indicative of the distance between the center of the vehicle and the reference central line (desired path) M (where L means the distance between the lane marker N and the reference central line M), and the inclinatory angle ΘV of the longitudinal axis (x-axis) of the vehicle with respect to the reference central line M (or the lane marker N).

Returning again to the explanation of FIG. 3, outputs of the side radars 12b which monitor an obstacle such as another vehicle running in the side and rear direction from the subject vehicle (the direction is occasionally a dead angle) are sent to an environment evaluation unit 68 which evaluates the environment around the subject vehicle by estimating the degree of danger when the traffic lane is changed. The CPU 2 receives the output of the environment evaluation unit 68 and evaluates whether the current steer angle is appropriate. The CPU 2 then evaluates the degree of danger if the traffic lane will be changed and when the degree of danger is high, increases or intensifies the steering force in the right or left direction in which the degree of danger is estimated to be high. The current corresponding to the thus determined steering force is input to the bias motor 34 through the motor amplifier 62.

Moreover, the CPU 1 is configured to predict the occurrence of a collision based on the information concerning the presence of obstacles before the vehicle and the current vehicle speed, and communicates with the CPU 3 controlling the vehicle speed to generate a command, via a driver circuit (not shown), to a braking actuator (not shown) to depress the brake pedal (not shown). Since, however, the gist of the invention does not reside in the braking operation, the operation of the CPU 3 will not be explained any more. In addition, the CPU 2 includes the operation of steer angle correction. However, since the gist of the invention does not reside in that, no explanation will here be made.

The operation of the system for correcting the steering force according to the invention will be explained with reference to the flowchart of FIG. 5. The operation is carried out by the CPU 2 and it thus controls the operation of the bias motor 34. The program is activated in the CPU 2 at predetermined intervals.

In S1 the detected vehicle speed V is read, and the program proceeds to S2 in which the deviation ΔL (indicative of the distance from the reference central line M) and the desired steer angle θD determined by the CPU 1 are read. The program next moves to S3 in which the detected vehicle speed V is compared with a predetermined vehicle speed VTH, e.g., 50 km/h, and when the detected vehicle speed V is found to be less than the predetermined vehicle speed VTH, the program is immediately terminated. On the other hand, when V is found to be not less than VTH, the program goes to S4 in which the deviation ΔL is compared with the aforesaid value L to determine whether ΔL exceeds L, in other words, it is checked whether the vehicle has changed the traffic lane (entered the next right or left traffic lane). When the answer in S4 is affirmative, the program is immediately terminated.

Explaining the above, the reason why S3 is inserted is that it is considered to be unnecessary to correct the steering force when the vehicle speed is at a relatively low speed. In that instance, it will suffice if the control is resumed when the driver resets the system through a switch (not shown). Since the control algorithm disclosed is for controlling the steering to keep running in the same traffic lane, when S4 finds that the lane has been changed, the system is configured to discontinue the operation until the driver resets the system. But for S4, the steering force would be increased to return the vehicle to the former lane notwithstanding that it has completed the lane change. Needless to say, the system may be configured to continue the control in the new lane, if the CPU 2 is modified to be able to recognize the crossing of the lane marker (N illustrated in FIG. 4) and to redetermine a new desired path in the next lane.

Figure 5:
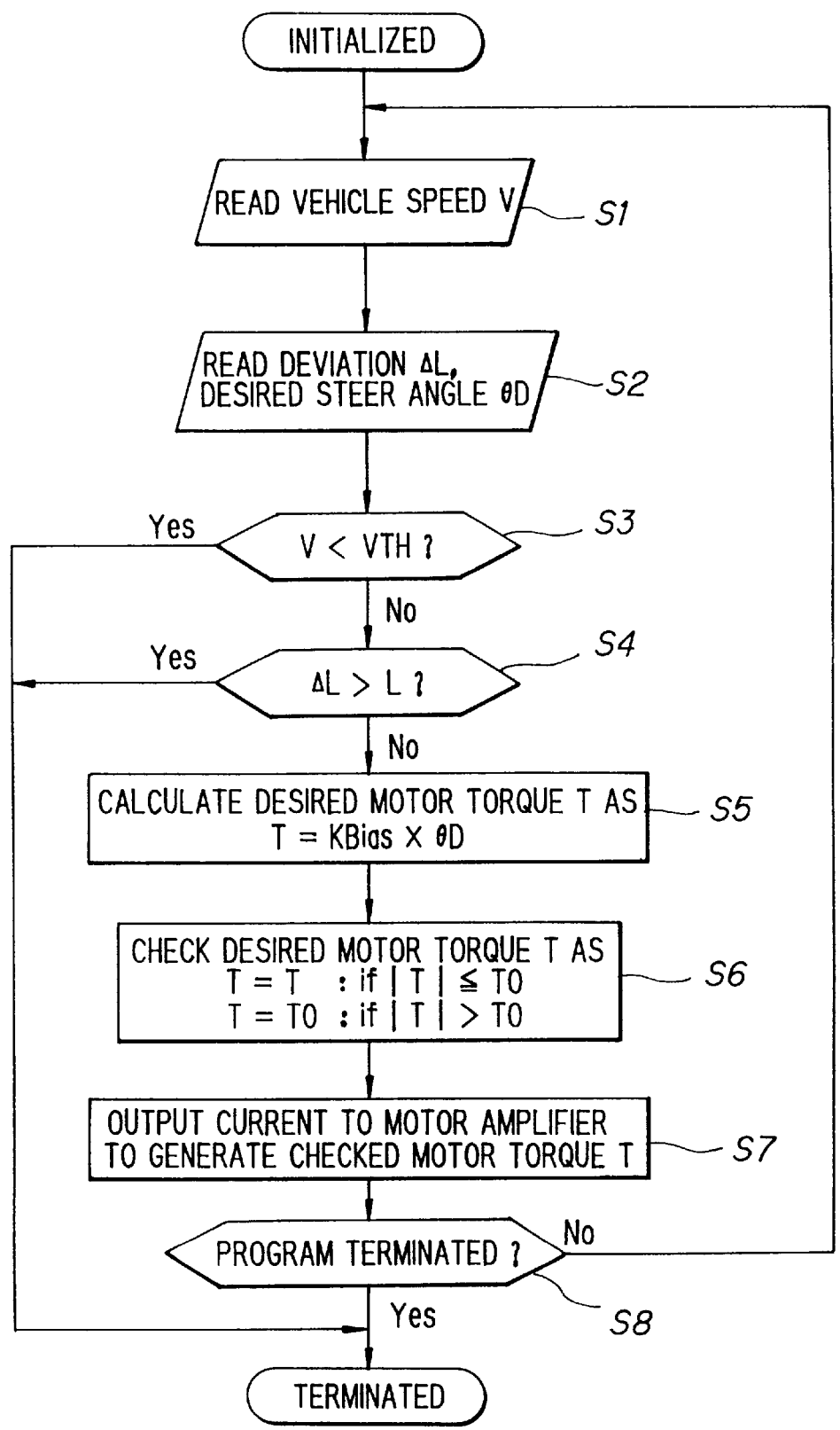
FIG. 5 is a flowchart showing the operation of the system illustrated in FIG. 1.

In the flowchart of FIG. 5, when the result in S4 is negative, the program goes to S5 in which a desired motor torque T of the bias motor 34 is calculated or determined by multiplying the desired steer angle θD by a gain (proportional gain appropriately set) KBias. Here, since the desired steer angle θD is a value determined based first on a desired point on the desired path M, it can be said that to determine the desired motor torque corresponds to determining a desired steering force to be generated by the steering mechanism necessary for keeping a desired position of the vehicle with respect to the traffic lane based on the detected position of the vehicle such that the biasing means (bias motor 34) biases the steering mechanism such that the steering mechanism generates the desired steering force determined.

The program next goes to S6 in which the determined desired motor torque T is checked. Specifically, the absolute value of the calculated torque is compared with an upper limit value T0 and when the absolute value is found to exceed the upper limit value T0, the calculated torque is limited to the upper limit value. The program then advances to S7 in which a current is calculated and is output to the motor amplifier 62 such that the bias motor 34 generates the determined and checked motor torque. The program then goes to S8 in which it is checked whether the program should be terminated and if not, it goes back to S1 and repeats the same procedures.

Thus, the system can be configured such that the system determines the amount of steering force optimum for the driver to steer the vehicle to run easily along the traffic lane. The system can thus provide the information to a human being (driver) as the steering force so as to coexist with him, and can further vary the degree of participation of a human being continually towards the automatic steering where the human being does no longer participate in the driving.

Furthermore, since the system is basically configured such that it achieves the objects by controlling the amount of steering force, failsafe is inherently ensured even when the bias motor in the system fails. Specifically, only the steering force becomes different from desired in case of motor failure, and the most significant role of the steering system to avoid obstacles will remain unchanged. In addition, the characteristic feature of the system is that, since it can be realized by adding some components to the conventional mechanism, it is unnecessary to drastically alter manufacturing facilities in a factory. Since the system is compact and easy to manufacture, the reliability is excellent and less expensive in manufacturing cost. The characteristic features will be applicable to other embodiments described later.

The system has been described so as to show the basic concept of the invention such that it can be incorporated in a vehicle equipped with muscular-energy steering or power steering or power-assisted steering system. In the specification, the term "muscular-energy steering (system)" is used to mean a steering system in which the steering force is produced exclusively by the driver. The term "power steering (system)" is used to mean a steering system in which the steering force is produced exclusively by an energy source in the vehicle, and the term "power-assisted steering (system)" is used to mean a steering system in which the steering force is produced by the muscular energy of the driver and an energy source.

Although the degree of danger estimated by the environment evaluation unit 68 is not taken into account in the embodiment, it will easily be understood as the description proceeds that the estimated value can be added if desired.

Figure 6:
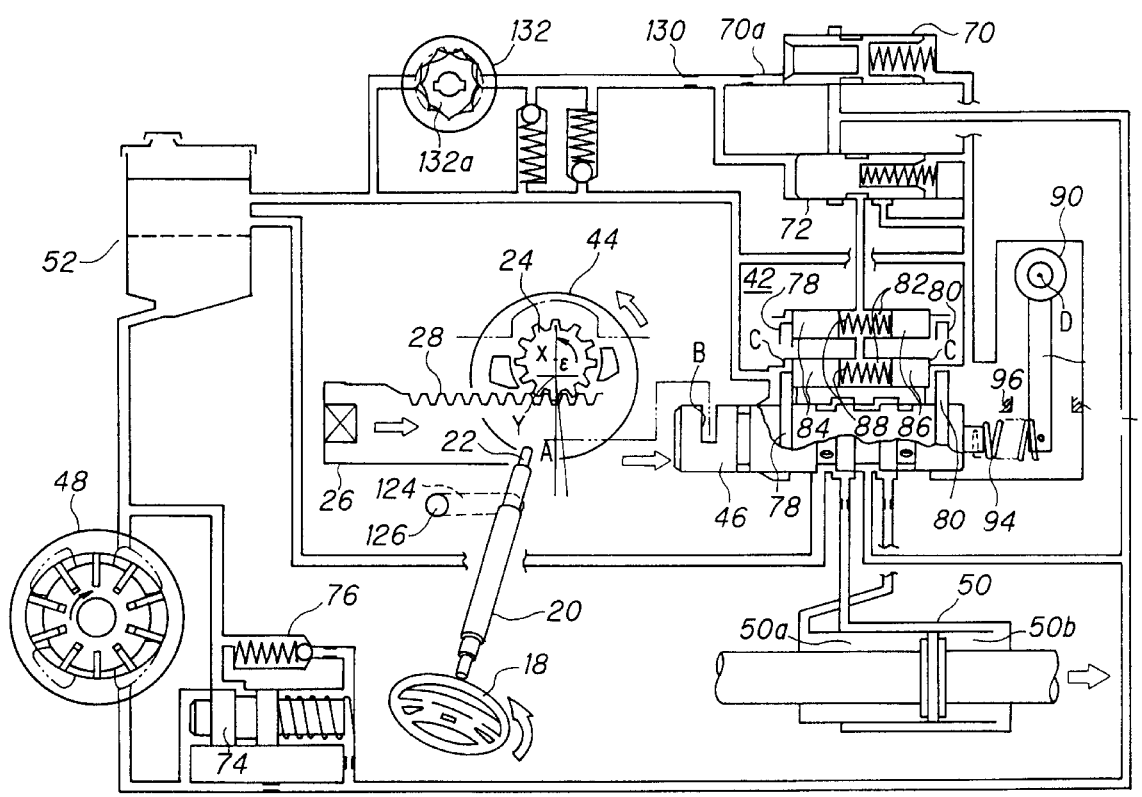
FIG. 6 is a hydraulic pressure control circuit of a power-assisted steering system in which the system for correcting the steering force of a vehicle according to a second embodiment of the invention is incorporated.

FIG. 6 shows a hydraulic control circuit of the hydraulic power-assisted steering system in which the steering force correcting system according to a second embodiment of the invention is incorporated. In the second embodiment and other embodiments explained later, the same reference numerals will indicate the same components as those in the first embodiment.

Although the system according to the first embodiment is applicable to all kinds of steering systems, the system according to the second embodiment is only applicable to power steering or power-assisted steering systems. FIG. 6 illustrates the condition in which the steering wheel 18 is being moved or rotated in the left direction.

Specifically, the pinion shaft 22 having the pinion gear 24 at its free end is rotatably housed in a pinion holder 44 in a known manner. The holder 44 thus housing the shaft is rotatably housed in a case 42. When the steering torque (steering wheel actuating force) is exerted on the pinion shaft 22, a pinion holder pin (not shown) moves in the right or left direction to displace a four-way valve 46 from the neutral position to the right or left direction, such that in a power or steering cylinder 50, one chamber 50*a* or 50*b* is connected with the pressurized oil supply line from a vane pump 48 (driven by the internal combustion engine of the vehicle (not shown)), while the other chamber 50*b* or 50*a* is connected with an oil reservoir 52, thereby generating the desired power-assist.

In FIG. 6, thus, the vane pump 48 pumps oil from the oil reservoir 52 to pressurize and provide the pressurized oil to an inlet port of the four-way valve 46 and two other control valves (a pressure reducing valve 70 and a variable restrictor or metering valve 72) which operate in response to the vehicle speed. Reference numeral 74 designates a known flow control valve for restricting the amount of oil to be constant against the fluctuation of the pump discharging amount. Reference numeral 76 indicates a known pilot relief valve.

As mentioned earlier, the pinion gear 24 is rotatably housed in the pinion holder 44 which is in turn rotatably housed in the case 42. It should be noted that the center of rotary motion X of the pinion gear 24 is offset upwardly from that Y of the holder 44 by ϵ. A holder pin (not shown) is provided to project in the direction upwardly from the sheet of the figure from a point A on the holder 44. The pin is fitted in a slot B formed in the four-way valve 46. The four-way valve 46 has two pins 78 and 80 which extend upwards in the figure to embrace plungers 84 and 86 of a reaction chamber 82. The system has another reaction chamber which is disposed at the opposite side which is offset by 180° against the four-way valve 46. For ease of explanation, only one reaction chamber is correctly illustrated, while the other is schematically shown in the above.

Each reaction chamber 82 is provided with fluid pressure from the control valves 70 and 72 (which are responsive to the vehicle speed). A centering spring 88 is provided for urging the plunger 84 or 86 outwardly. The outward plunger motion is restricted by the right and left pins 78 and 80 or shoulders C formed at the wall of the case 42. When the four-way valve is in the neutral (straight-ahead steering) position, the distance between the shoulders C is designed to be equal to that between the pins. Since the basic concept of the system configuration is described in Japanese Patent Publication No. Sho 62(1987)-10871 proposed by the assignee, no further explanation will be made.

In the disclosed system according to the second embodiment of the invention, a bias motor (electric motor)(biasing means) 90 (which has the same function as the bias motor 34) is similarly provided. The bias motor 90 has an arm 92 which is swingable about point D. The arm 92 is brought into contact, via a spring 94, with the four-way valve 46 on the right in the figure. More specifically, when the bias motor 90 is driven, the arm 92 swings in the right or left direction to displace the spring 94. This motion thus acts on the four-way valve 46 as a kind of bias force. In order to restrict the stroke of the arm 92, stoppers 96 and 98 are provided in the right and left directions. This prevents the four-way valve 46 from being applied with excessive bias force.

Figure 7:
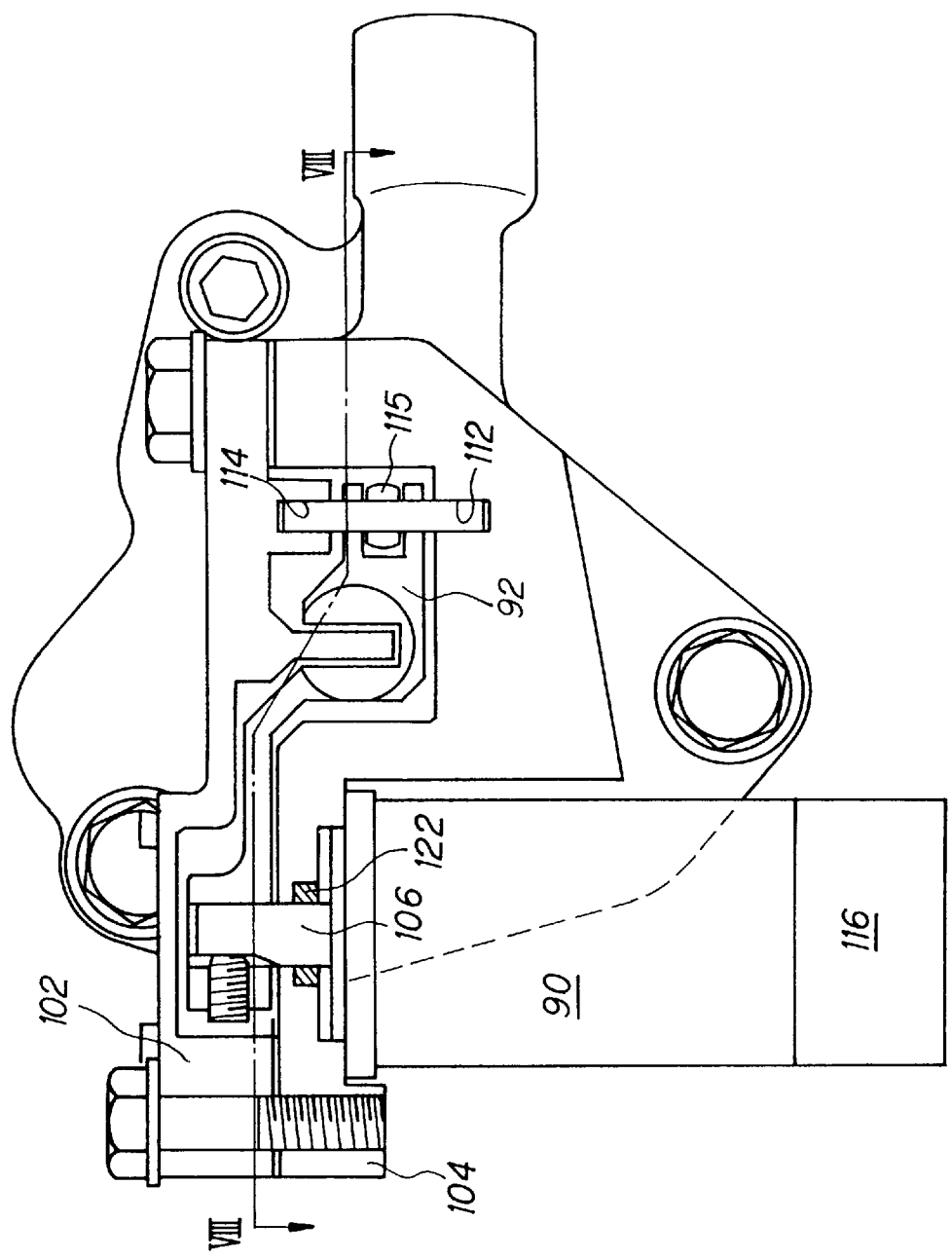
FIG. 7 is an explanatory side view of the structure around a bias motor illustrated in FIG. 6.
Figure 8:
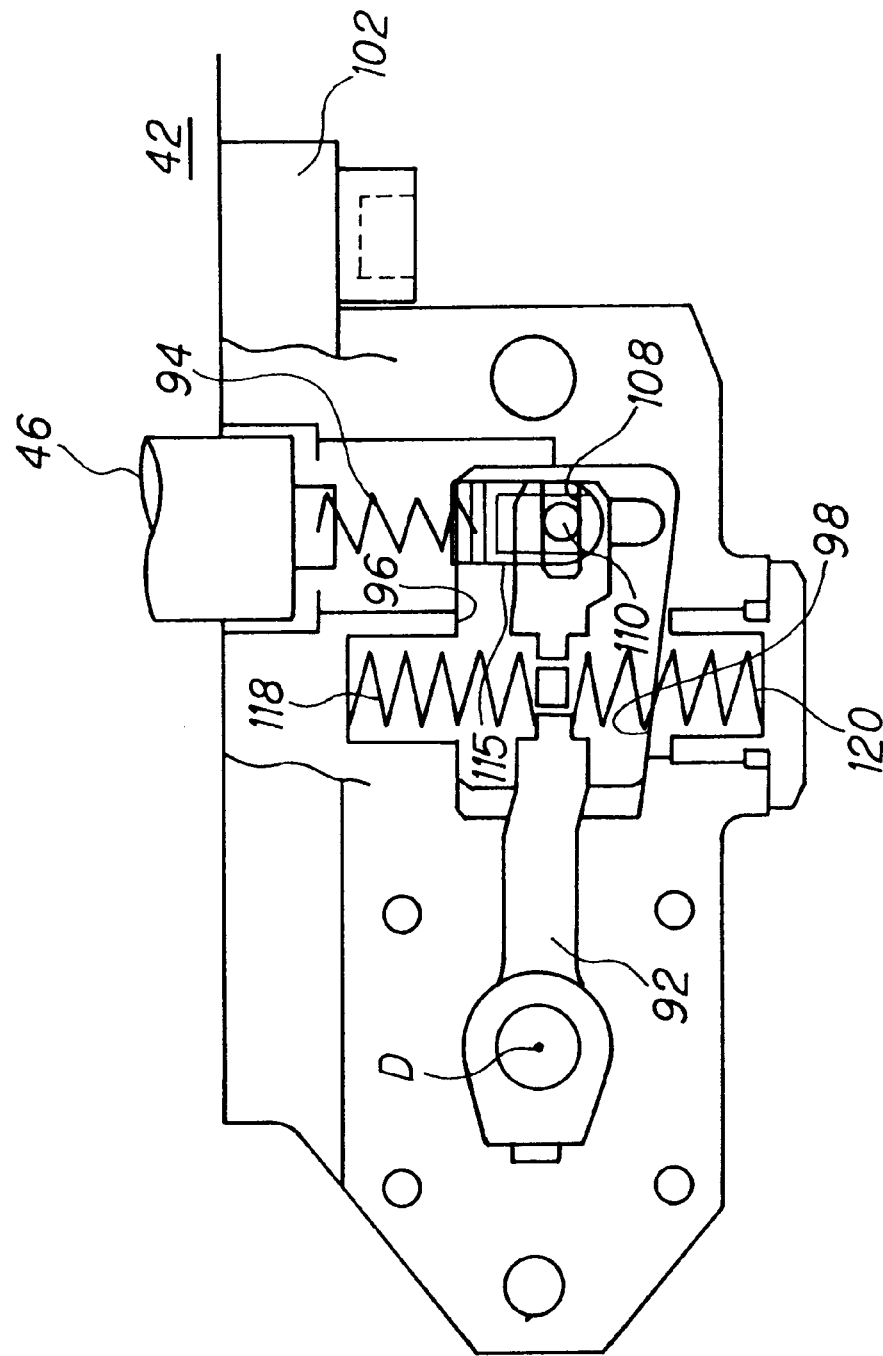
FIG. 8 is a cross sectional view taken along the line VIII—VIII of FIG. 7.

FIGS. 7 and 8 illustrates the structure around the bias motor 90 in detail.

The bias motor 90 is fixed in a housing 102, through a flange 104, which is attached to the case 42 housing the four-way valve 46. A motor output shaft 106 is secured to the arm 92. The arm 92 is formed with a slot 108 at the opposite end which houses a roller 110. Both ends of the roller 110 are inserted in guide slots 112 and 114 formed in the case such that the roller 110 is moved linearly along the guide slots. The roller 110 is rotatably engaged, at its middle, by a spring carrier 115 such that the roller releases or compresses the spring 94 in response to the swing motion of the arm 92. These components including the arm 92 are disposed in a space that is hydraulically sealed by a cover. The inside of the cover is filled with oil substantially under atmospheric pressure.

The bias motor 90 is provided with a rotary encoder 116 at the back to detect the amount of rotary motion of the motor. The motor is driven by a command signal which is determined based on the angular displacement detected by the encoder 116. The motor may be provided with a speed reducer to intensify the output torque.

The arm 92 is provided with centering springs 118 and 120 which mechanically ensure the arm to be urged to the neutral position (corresponding to the straight-ahead position at the steering wheel), when the vehicle is stopped and the current supply to the control unit 60 is discontinued. As will be seen from the figure, the springs are configured to apply the initial load toward the neutral position so as to ensure the arm to be returned to the neutral position (straight-ahead position). As disclosed in FIG. 7, the motor output shaft is sealed by an oil seal 122 to maintain the motor operation in good condition.

Again returning to the explanation of FIG. 6, the pressure reducing valve 70 regulates the fluid pressure from the pump to a constant low pressure and discharges fluid from a port 70a. The reduced fluid pressure acts on the left side of the variable restrictor 72 illustrated below in the figure to urge the valve to the right against the spring force. When the vehicle is stopped, the variable restrictor 72 operates to connect the reaction chamber 82 with the fluid pressure source to a slight extent by the level difference formed there, and at the same time, with the oil reservoir by another level difference. As a result, the pressure in the reaction chamber 82 is substantially kept under the atmospheric pressure.

The discharge port 70a of the pressure reducing valve 70 is connected with an oil pump 132 via a restrictor 130. The oil pump 132 is configured to rotate in synchronism with the transmission output shaft (not shown). The oil pump 132 houses a rotor 132a whose output shaft has a gear which is engaged with one of the differential gears constituting the transmission output shaft. The oil pump rotor 132a stops when the vehicle speed is zero and rotates at a speed that increases proportionally with increasing vehicle speed, thereby pumping oil from the right to the left port in the figure. The amount of oil passing through the oil pump 132 increases as the vehicle speed increases. When the oil pump 132 is stopped, the pressure at the left side of the variable restrictor 72 in the figure is regulated to the level determined by the pressure reducing valve 70 and acts on the restrictor 72 to urge the same right. When the pump 132 is started to rotate, the oil at the left side of the restrictor 72 is pumped, the pressure drops, causing the restrictor 72 to be displaced leftward by the spring force acting from the right. Thus, as the vehicle speed increases, the sealing effect of the level difference for connecting the reaction chamber 82 to the fluid pressure source decreases, while that for connecting the chamber to the oil reservoir increases. The reaction chamber 82 is disconnected from the oil reservoir and is completely connected to the fluid pressure source at a high vehicle speed, causing the driver to have a feeling that is proportionate to the reaction force from the road surface as is well-known.

The operation of the power-assisted steering system will now be explained.

Assume no actuating force is exerted at the steering wheel 18 in the neutral (straight-ahead) position, no force is present between the pinion gear 24 and the rack gear 28. The four-way valve 46 is at the neutral position by the force of the spring 88 in the reaction chamber 82 and operates according to the open center principle such that the pressurized oil flows back to the oil reservoir. The fluid pressure is substantially zero and the pressures in the right and left chambers 50a and 50b of the power cylinder 50 are kept zero.

Assuming that the steering wheel 18 is being moved left as shown by the arrow as mentioned before, the rack shaft 26 does not move due to the resistance from the road surface. The torque exerted on the pinion gear 24 will urge it to roll left on the rack gear 28, since the rack shaft 26 does not move. The pinion gear rolling is, however, restricted by the spring force in the reaction chamber 82. When the rolling force of the pinion gear is less than the spring force, the four-way valve 46 remains at the neutral position, producing no power-assist. Here, if the torque acting on the pinion gear 24 exceeds the resistance from the road surface acting on the front (steer) wheels, the front wheels could be turned without power-assist. This will be happen when the vehicle is on ice where the front wheels easily slip, or the vehicle is running and the reaction force from the road surface is small.

If the actuating force at the steering wheel 18 becomes large enough sufficient for causing the pinion gear 24 to roll left on the rack gear 28, the four-way valve 46 moves, compressing the inner spring, right. As a result, the left chamber 50a of the power cylinder 50 is connected to the fluid pressure source, while the right chamber 50b thereof is connected to the oil reservoir. The rack shaft 26 is driven right by the resultant force made of the pinion torque and the fluid pressure to produce the power-assist. Thus, the component made of the pinion shaft 22, the pinion gear 24, the rack shaft 26 and the rack gear 28, etc., acts as a kind of steering force detecting means.

Figure 9:
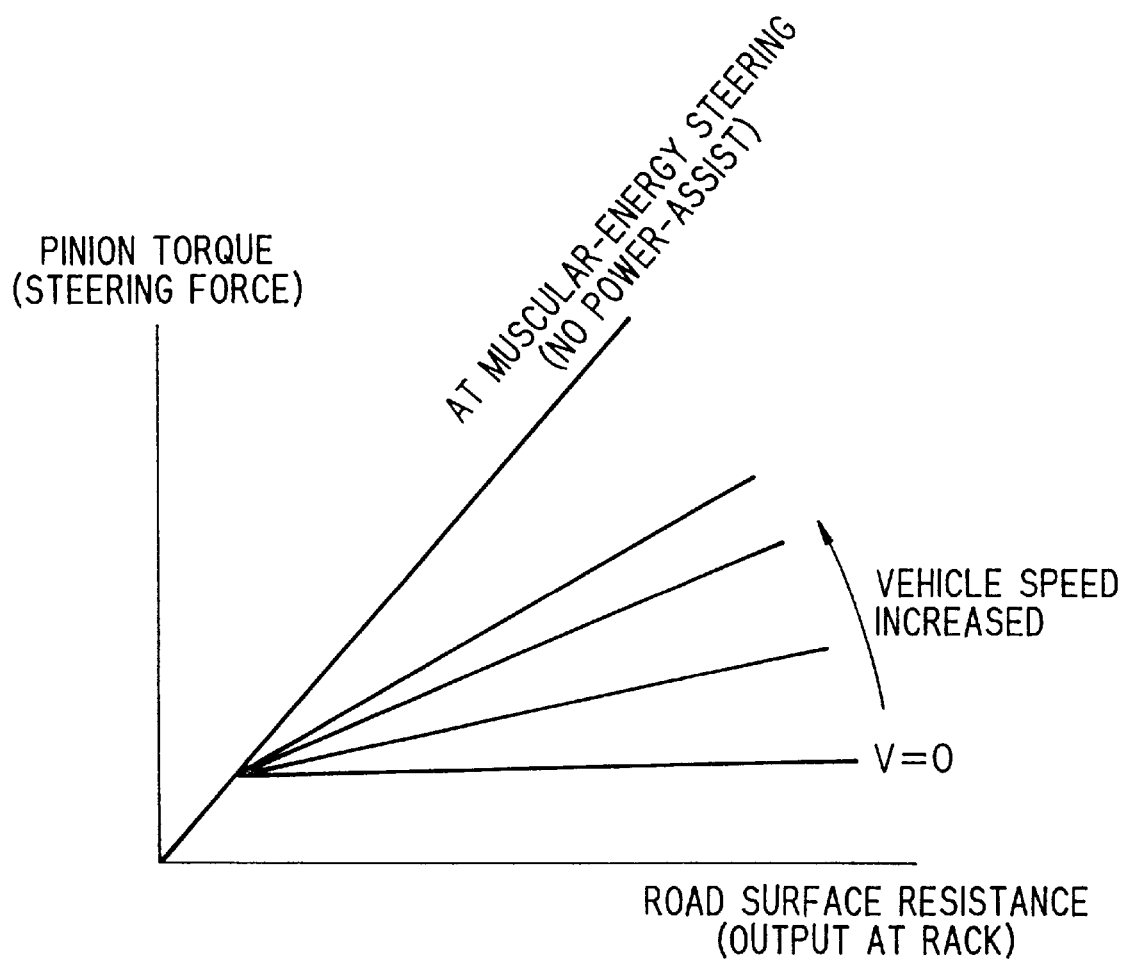
FIG. 9 is a graph showing the conventional steering characteristics of the hydraulic power-assist steering system illustrated in FIG. 6.

Since the reaction chamber 82 is provided with the fluid pressure at a high vehicle speed, the four-way valve is returned to the neutral position as the fluid pressure increases. The amount of fluid pressure depends on the stroke of the variable restrictor 72 in the left direction, in other words, it depends on the vehicle speed. The fluid pressure introduced in the reaction chamber 82 and hence the force to return the valve 46 to the neutral position decreases with decreasing vehicle speed. FIG. 9 shows the characteristics of the steering force (pinion torque) with respect to the resistance from the road surface (output at the rack) in the thus far disclosed system. The above is known in the art and does not constitute the characteristic features of the invention.

Next, assume that the bias motor 90 in the system illustrated in FIG. 6 operates and the arm 92 is driven to swing clockwise by certain angles from the position illustrated, such that the four-way valve 46 is biased to the left. In that case, the pinion torque necessary for displacing the valve 46 to the right must be greater. This makes the power-assist in the left direction more difficult to be produced, rendering steering to the left harder. On the other hand, due to the bias force, less pinion torque is needed for displacing the valve 46 to the left, rendering the power-assist in the right direction to be generated easily. Thus, by swinging the arm 92 clockwise, the steering toward the right is light, while that in the opposite direction is heavy. The steering force is thus made different in the right and left directions.

Figure 10:
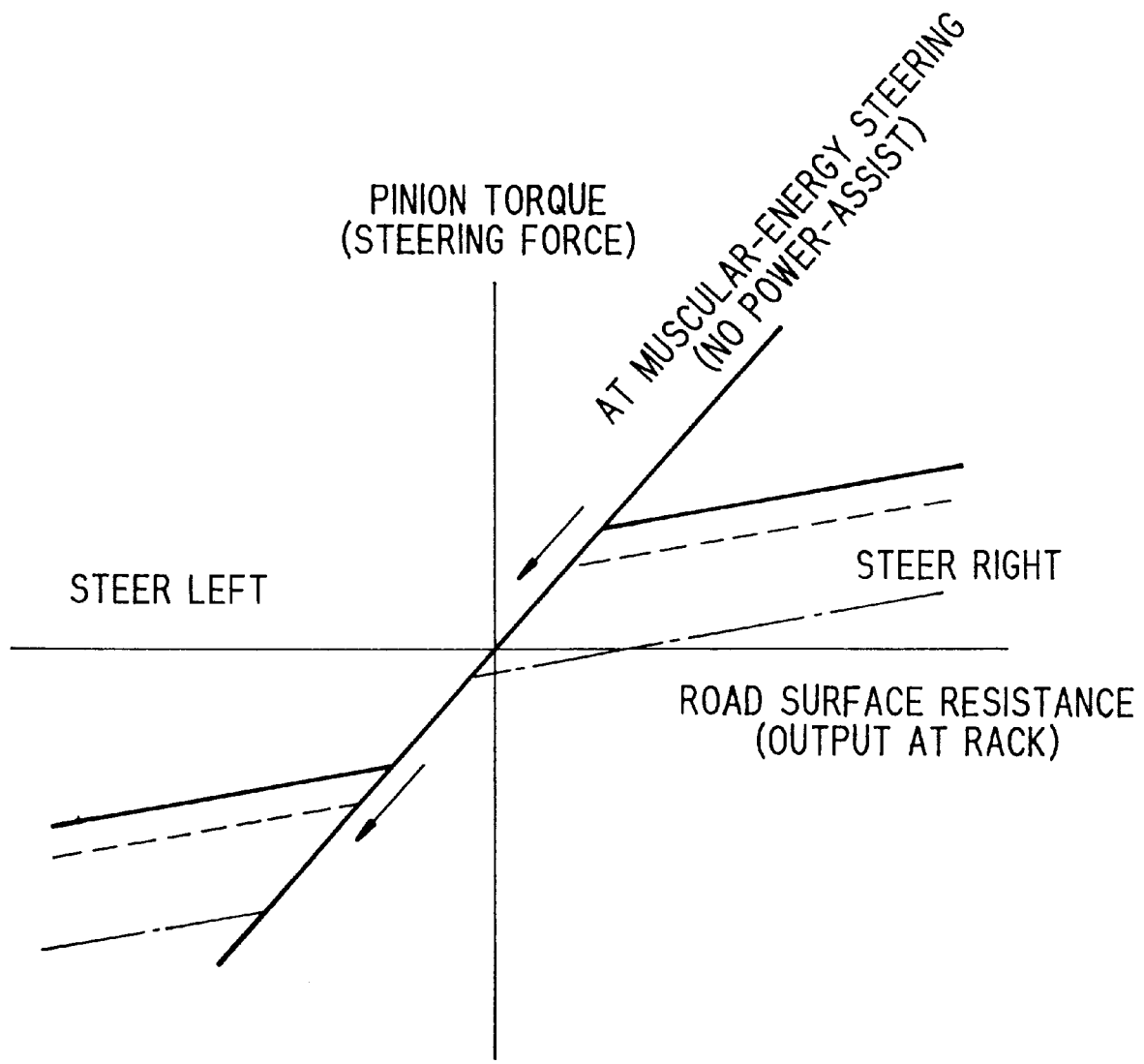
FIG. 10 is a graph showing the steering characteristics obtained in the system according to the second embodiment of the invention.

FIG. 10 shows this feature. In the characteristics shown there, the initiation point of the power-assist shifts, with increasing biasing force, along the characteristic line of the muscular-energy steering system. Since the system is configured such that the bias force only acts on the spring 88 in the reaction chamber, the characteristics (shown by dashed lines) are parallel translated from the conventional power-assist characteristics (shown by solid lines), as shown by the arrows, along the straight line of the muscular-energy steering system. It will be easily understood from the above that to swing the arm counterclockwise makes steering right heavy, while steering left light.

When the bias force is determined larger than the preset force of the spring 88 in the reaction chamber, the characteristics will be as shown by dot-and-dash lines in the figure. More specifically, even when the pinion torque (pinion input) is zero, the road surface resistance (output at the rack) is generated, so that a minus steering force is produced. Under such condition, the steering wheel 18, if released, will rotate by itself, causing to steer the vehicle automatically. The amount of steering is, however, limited to the extent that it balances with the reaction force from the road surface. If the bias force is further increased, the front wheel turning angle (steer angle) can be increased.

It should be noted that the reaction force mentioned here is the aligning torque while the vehicle is running that acts to turn the tires in the straight-ahead position based on the geometry of the suspension.

It will be apparent from the above that the front wheel turning angle can be controlled by increasing/decreasing the bias force. Since, however, it is difficult to accurately control this in an open-loop fashion, a rotary encoder 126 is provided for detecting the amount of rotation of the steering shaft 20. Since the steering shaft 20 rotates as a result of the exerted bias force, the CPU 2 controls the bias motor 90 through a similar motor amplifier used in the first embodiment such that the detected amount of steering shaft rotation is brought to the desired steer angle.

Based on the foregoing, the operation of the system according to the second embodiment will now be explained with reference to the flowchart of FIG. 11.

The figure shows the control algorithm of the CPU 2 which controls the operation through the bias motor 90. For ease of explanation, it is assumed here that the degree of danger α is estimated only for the right lane viewed from the current lane on which the vehicle is running. If the degree should be estimated both for the right and left lanes, it suffices if similar procedures are followed for the left lane.

Explaining the flowchart, in S10 the detected displacement or position β of the bias motor 90 (obtained from the output of the encoder 116 through appropriate conversion) and vehicle speed V are read, and the program proceeds to S12 in which the outputs of the CPU 1, i.e., the deviation ΔL from the central line (desired path) M, the inclinatory angle ΘV of the longitudinal axis of the vehicle with respect to the central line, the desired steer angle θD and the degree of danger αR in the right direction estimated by the environment evaluation unit 68 are read. The degree of danger αR will here be explained.

The side radars 12b detect the relative distance D between the subject vehicle and other vehicles running in the right (or left) lane. If differentiating D to obtain the value dD, the value indicates the relative vehicle speed with respect to the other vehicle. The degree of danger αR is defined in the embodiment as follows:

$$\alpha R = A - (Kd \times dDR) - (KD \times DR)$$

where αR≧0; A, Kd and KD are each a constant.

What is meant in the above is that, when the relative vehicle speed dD is a positive value, it means that the other vehicle is moving away from the subject vehicle. The degree of danger thus decreases as dD increases. On the other hand, when dD is a minus value, this means that the other vehicle is closing, the degree of danger increases as the absolute value of dD increases. Since the relative distance D is always a positive value, the degree of danger decreases as the value D increases. Since the degree of danger should not be a negative value, the degree is made 0 when the calculated value becomes negative. In the equation, the suffix R means the value in the right lane. When a similar value is calculated for the left lane, it must be added with the suffix L.

It should be noted here that, since the differentiation is complicated, if the sampling interval is constant, it is alternatively possible to obtain a difference between the current distance D1 sampled at the current interval and the proceeding distance D1-1 sampled at the proceeding interval, as dD=D1-D1-1.

It should also be noted here that, even when the degree of danger is calculated only for either of the right or left lane, if an obstacle such as a troubled vehicle is present ahead in the current lane on which the subject vehicle is running, the degree of danger should similarly be calculated for the current lane. Moreover, although the degree of danger is defined in a simple linear function, it is alternatively possible to define it by calculating and using the square of the relative distance or vehicle speed and some similar values.

Figure 11:
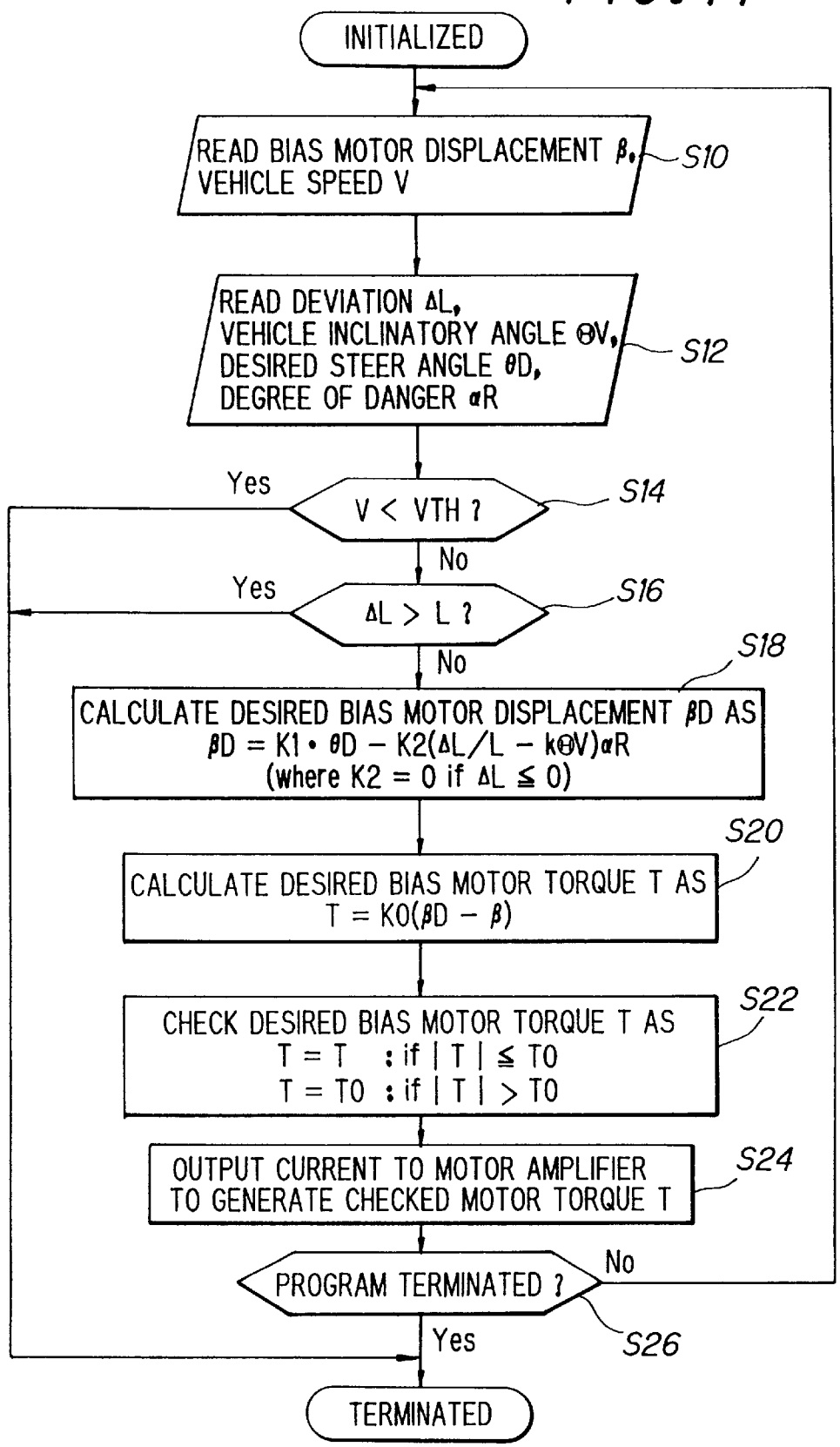
FIG. 11 is a flowchart showing the operation of the system according to the second embodiment of the invention.

In FIG. 11, the program then proceeds to S14 in which it is checked whether the current vehicle speed V is less than the predetermined vehicle speed VTH and if the result is affirmative, the program is immediately terminated for the same reason as that in the first embodiment. If not, on the other hand, the program goes to S16 in which it is checked whether the deviation ΔL is larger than the lane width L, i.e., it is checked whether the vehicle has entered the adjacent right or left lane and if it has, the program is immediately terminated for the same reason as is mentioned in the first embodiment.

When the result in S16 is negative, the program goes to S18 in which the desired bias motor displacement or position (desired bias force) βD is calculated. More specifically, the desired steer angle θD is multiplied by a gain K1 (proportional gain appropriately set), and the difference between ΔL/L and the product of the vehicle inclinatory angle ΘV and a gain k are multiplied by a gain K2 (proportional gain appropriately set) which is corrected by the degree of danger αR. The difference between the two products is then obtained to determine the desired displacement βD. The desired displacement is basically determined by multiplying the desired steer angle θD by the gain and then the bias motor is driven to displace (swing) the arm 92 such that the desired steering force is achieved. Since the spring 94 that determines bias force in cooperation with the arm displacement by the bias motor 90, is configured to have linear characteristics in the embodiment, the desired displacement βD is determined in proportion to the desired steer angle θD. As mentioned in the first embodiment, it can again be said that the desired steer angle θD is a value necessary for keeping a desired position of the vehicle in the traffic lane based on the detected vehicle position.

In the above, the reason why the gain K2 is corrected by the degree of danger αR is that, since the fact that the degree of danger αR is not zero indicates a situation that another vehicle is closing in the right lane, it is therefore preferable to increase the gain K2 to raise the control response in order to avoid a collision therewith. However, assuming that the subject vehicle is already being steered to the right, if the bias force is increased by the gain, the subject vehicle will be strongly guided to return to the former lane by the raised gain, and what is worse, the vehicle might further be guided to cross the opposite lane marker toward the left lane. It would be disadvantageous if this happened. Therefore, as shown in S18, when the subject vehicle crosses the center of the lane toward the opposite lane marker, i.e., $\Delta L \leq 0$, the gain K2 is decreased to zero so as to prevent the above problem from happening. Saying this in other words, the gain K2 is increased with increasing $\Delta L$ when the subject vehicle is located between the center and the right lane marker adjacent to the right lane where another vehicle follows, whereas K2 is kept 0 when the own vehicle is located between the center and the opposite left lane marker.

Moreover, the system should preferably have a good control response in case of an emergency. For that reason, when the driver steers the vehicle to change the direction by the angle $\Theta V$ with respect to the central line (or lane marker), the gain K2 is raised using the angle $\Theta V$. This is because since the value is a sign indicating that the driver intends to steer the vehicle toward the next lane, increasing the gain will be helpful to raise the control response. This will be a kind of differential control. The same effect will of course be achieved by using, instead of $\Theta V$, the actuating speed of the steering wheel 18.

The program then proceeds to S20 in which the calculated desired displacement βD is subtracted by the detected bias motor displacement β and the difference is multiplied by a gain K0 to determine the desired torque T of the bias motor 90. The program then goes to S22 in which the calculated torque T is compared with an upper limit T0 and if it is found to exceeds the limit, the calculated torque T is replaced by the limit T0. Since the stroke of the arm 92 is limited by the stoppers 96 and 98, the excessive torque will invite waste of electric energy. Moreover, this can prevent the motor from being damaged by heating up.

The program then goes to S24 in which the amount of current to be supplied to the motor is determined such that the calculated torque is achieved and is output to the motor amplifier. The supply of current is controlled in a closed loop such that the error between the output of the encoder 116 and the desired value decreases. The program advances to S26 in which it is checked whether the program should be terminated, and unless the result is affirmative, the program flows back to S10 to repeat the above procedures.

Being configured in the foregoing manner, the system can correct the steering force to be a certain value by predicting a future vehicle behavior or condition based on the state of the current vehicle running conditions in accordance with the concept of feedforward control, so as to allow the driver to correct the steering such that the behavior of the vehicle coincides with that which he expects, or by providing through the steering force the information about the danger which would otherwise occur due to a cause that the driver might have overlooked.

Moreover, the system predicts a future vehicle condition or behavior and provides it to the driver by making the steering force in the right or left direction different, and urges him to avoid a possible danger which would otherwise happen. In a vehicle equipped with power-assisted steering or power steering, the system can achieve the same effects by varying the amount of power-assist. Furthermore, the driver can not only maneuver at his discretion using all his senses, but also steer the vehicle optimally referring to the operation of the system. More specifically, the system is configured such that, when the driver's judgment and the steering force determined by the system is not the same, the driver can override the system operation. The system is further configured such that, when to steer right or left is found to be inappropriate, the steering force in both directions is made greater in response to the degree of inappropriateness.

Thus the system can be configured such that the system determines the amount of steering optimum for the driver to steer the vehicle to run easily along the traffic lane. The system can thus provide the information to a human being (driver) through the steering force so as to coexist with him, and can further vary the degree of participation of a human being continually towards automatic steering where the human being does no longer participate in the driving. It should be noted that the system can guide the driver to steer the vehicle not only along a straight road, but also along a curved road.

More specifically, since the system is configured such that, even when the input at the pinion is zero as illustrated by the one-dot-chain lines in FIG. 10, output at the rack is generated, in other words, a minus steering force is produced to cause the steering wheel to rotate by itself, the driver can steer the vehicle using all his senses while referring to the output of the system when he is sensible. On the other hand, when the driver is less alert, he can depend on the system that generates the minus steering and prevent the vehicle from diverting from the lane, while avoiding an obstacle, if any, ahead of the vehicle. When the system guides the driver by the steering force thus, he feels as if he were running on a course whose center is caved in just like a bobsled course. As a result, even if he intentionally or unintentionally tries to steer to right or left from a straight center line, the heavy steering in that direction will prevent him from diverting from the center of the course. The system can thus create imaginary ridges on the right and left lane markers such that the driver is urged to return to the center and steer the vehicle between the ridges.

On the other hand, if he wishes to change lane, it suffices if he moves the steering wheel by the force enough to ride across the imaginary ridges. When other vehicles are closing on the next lane, he would feel the imaginary ridge, at the side where the vehicle is closing, having a height corresponding to the degree of danger. Even if he tries to steer his vehicle in that direction, he would be pushed back by virtue of the imaginary ridge. A collision would therefore be avoided beforehand. When the distance to the other vehicle becomes great or the other vehicle diverts to another lane, the imaginary ridge would accordingly vanish. Since the system is configured such that the steering force is increased, in other words, the height of the imaginary ridge is increased in response to the inclinatory angle of the vehicle longitudinal axis with respect to the central line or lane marker, the control response is enhanced.

Since the imaginary ridge is built only when his vehicle is steered towards the direction in which another vehicle is closing, he can steer the vehicle without feeling the imaginary ridge when he runs it along the center of the lane. Even when he is pushed back by the imaginary ridge, he will not be aware of the ridge after he has returned to the center of the course. He would not be pushed back across the center toward the opposite lane. At that instance, the ridge begins to lessen immediately as soon as the steering is urged to be pushed back, since the inclinatory angle of the vehicle of the longitudinal axis has turned to a negative value. The driver would have no longer an attention on the imaginary ridge.

Moreover, since the steering force can be determined separately for the right and left directions, it is possible to steer the vehicle coping with the conditions occurring in these directions. The fact that the bias force is limited by the mechanical stoppers 96 and 98, the bias force can be limited to the level determined by the stoppers and the human being's judgment overrides the operation of the system even when there is inconsistency between his judgement and the system operation. Furthermore, since the system is configured to have springs 118 and 120 that urge the steering mechanism to the neutral (straight-ahead) position, i.e., more specifically, since the arm 92 is urged to the neutral position by the springs 118 and 120 assigned with the initial load, it is easy to start the operation from the neutral position when the system is initialized.

Furthermore, since the system is basically configured such that it achieves the objects by controlling the amount of steering force, failsafe is inherently ensured even when the bias mechanism fails. Specifically, only the steering force becomes different from desired in case of motor failure, and the most significant role of the steering system to avoid obstacles will remain unchanged. In addition, the characteristic feature of the system according to the second embodiment is that, like the first embodiment, it is unnecessary to drastically alter manufacturing facilities in a factory since it can be realized by adding some components to the conventional mechanism. Since the system is compact and easy to manufacture, the reliability is enhanced and less expensive. In particular, when the system is incorporated into a power-assisted steering system, the bias motor output does not need to be large, rendering the system configuration compact. On the other hand, the system can be realized with a muscular-energy power steering system if a larger motor is used.

Figure 12:
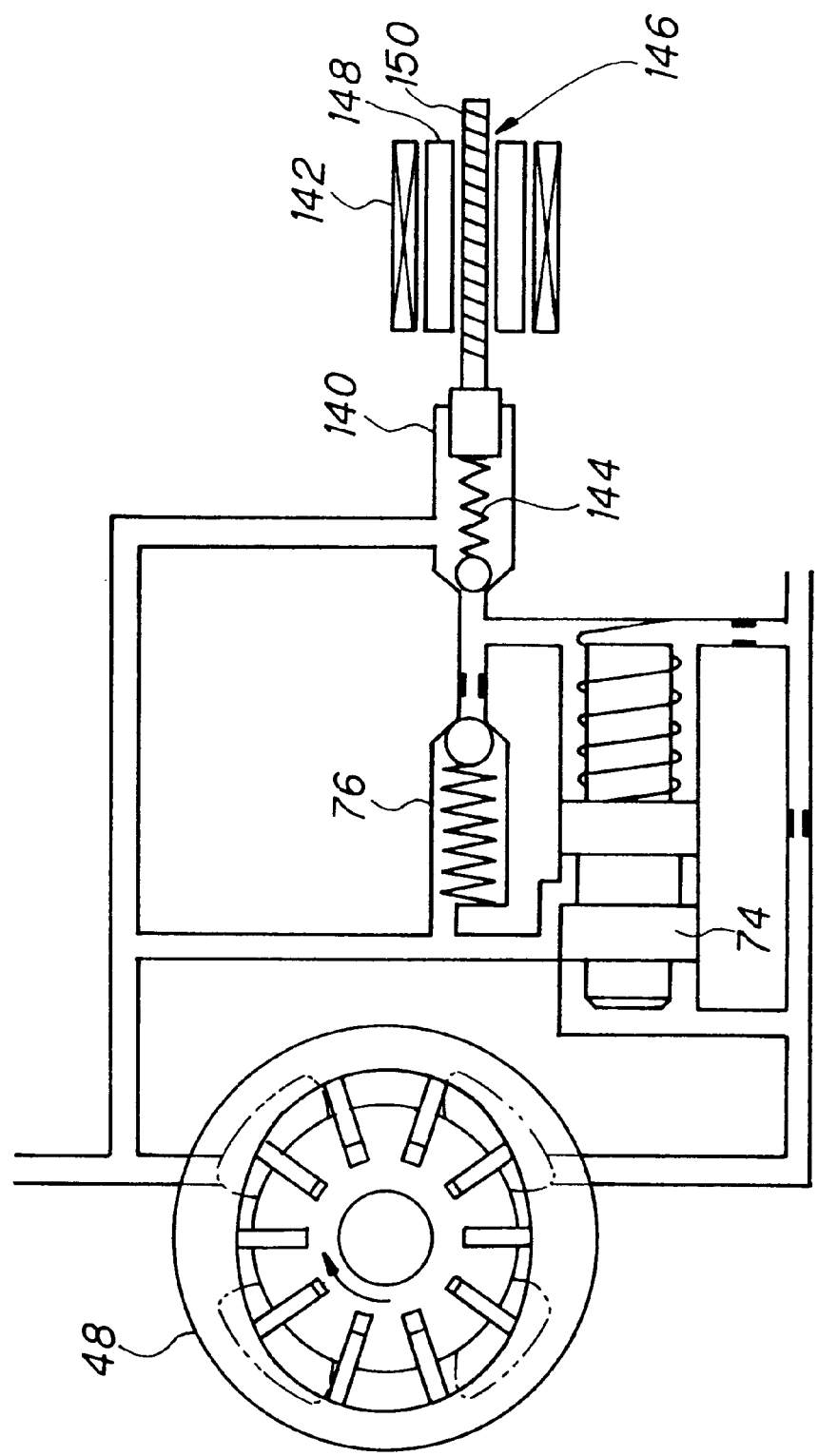
FIG. 12 is a partial view of a hydraulic pressure control circuit of a power-assisted steering system, similar to that illustrated in FIG. 6, showing the system for correcting the steering force of a vehicle according to a third embodiment of the invention.

FIG. 12 illustrates a portion of a hydraulic control circuit similar to that shown in FIG. 6, but showing the system according to a third embodiment of the invention. The rest of the circuit is the same as that disclosed in FIG. 6.

In the system according to the third embodiment, in parallel with the pilot relief valve 76 for the vane pump 48, a second pilot relief valve 140 and a servo motor 142 are provided. Specifically, it is configured such that the second pilot relief valve 140 has a spring 144 which determines the hydraulic pressure. The characteristics of the spring 144 are variably controlled by the servo motor 142. Since the two pilot relief valves 76 and 140 are provided in parallel, the maximum hydraulic pressure of the circuit is limited to a lower one determined by either of the valves.

Although the arm motion can be used similar to the second embodiment, a screw device 146 is used for varying the characteristics of the spring by the rotary motion of the servo motor 142. The screw device 146 has a female screw 148 (fixed to the rotor of the servo motor 142 coaxially therewith) which rotates with the rotation of the servo motor 142 to linearly displace a male screw 150 which in turn compresses/releases the spring 144. When the CPU 2 determines it improper to steer in either direction, it drives the servo motor 142 to lower the spring force of the second pilot relief valve 140 to lessen the maximum hydraulic pressure, thereby weakening the power-assist (decreasing the amount of power-assist) such that more actuating force is needed for moving the steering wheel 18.

Figure 13:
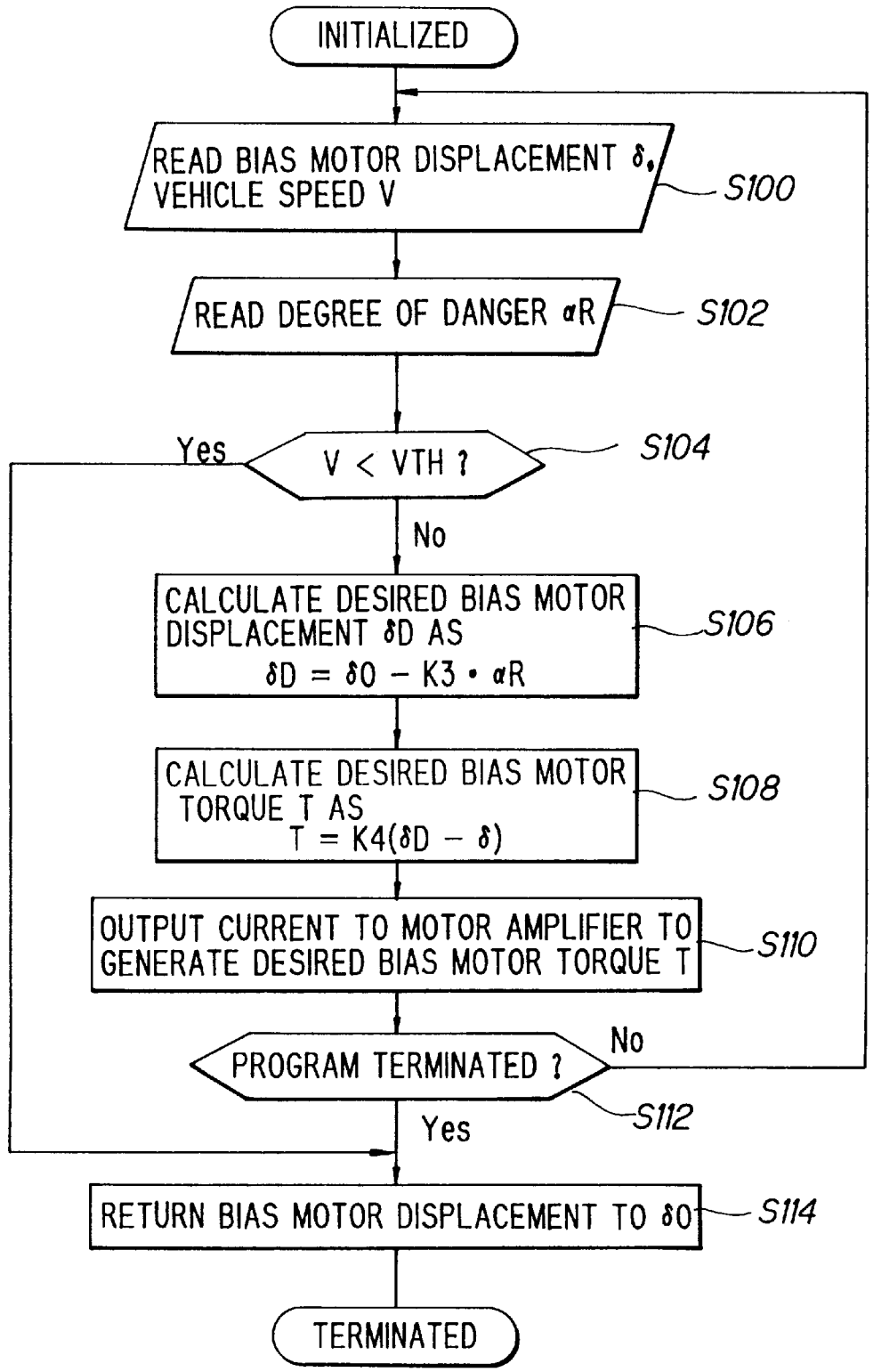
FIG. 13 is a flowchart showing the operation of the system according to the third embodiment of the invention illustrated in FIG. 12.

FIG. 13 is a flowchart showing the operation of the system according to the third embodiment of the invention.

The program begins and passes to S106, via S100 to S104 (similar to S10 to S14, in which a basic value δ0 is subtracted by the product obtained by multiplying the degree of danger αR by a gain K3 (proportional gain appropriately set) to determine the desired displacement or position δD so as to lower the hydraulic pressure set by the pilot relief valve 140 in response to the degree of danger.

The program then goes to S108 in which the difference between the desired displacement δD and the detected displacement δ is calculated and the difference is multiplied by a gain K4 to determine the desired torque T of the servo motor, and proceeds to S110 in which the current is output to the motor amplifier to generate the torque. The program then advances to S112 in which it is checked whether the program should be terminated and if not, it returns to S100 to repeat the procedures mentioned above. When S104 finds that the vehicle speed V is less than the predetermined vehicle speed VTH, the program jumps to S114 in which the servo motor displacement is returned to the basic value δ0, since the control is not carried out for the reason mentioned earlier.

Figure 14:
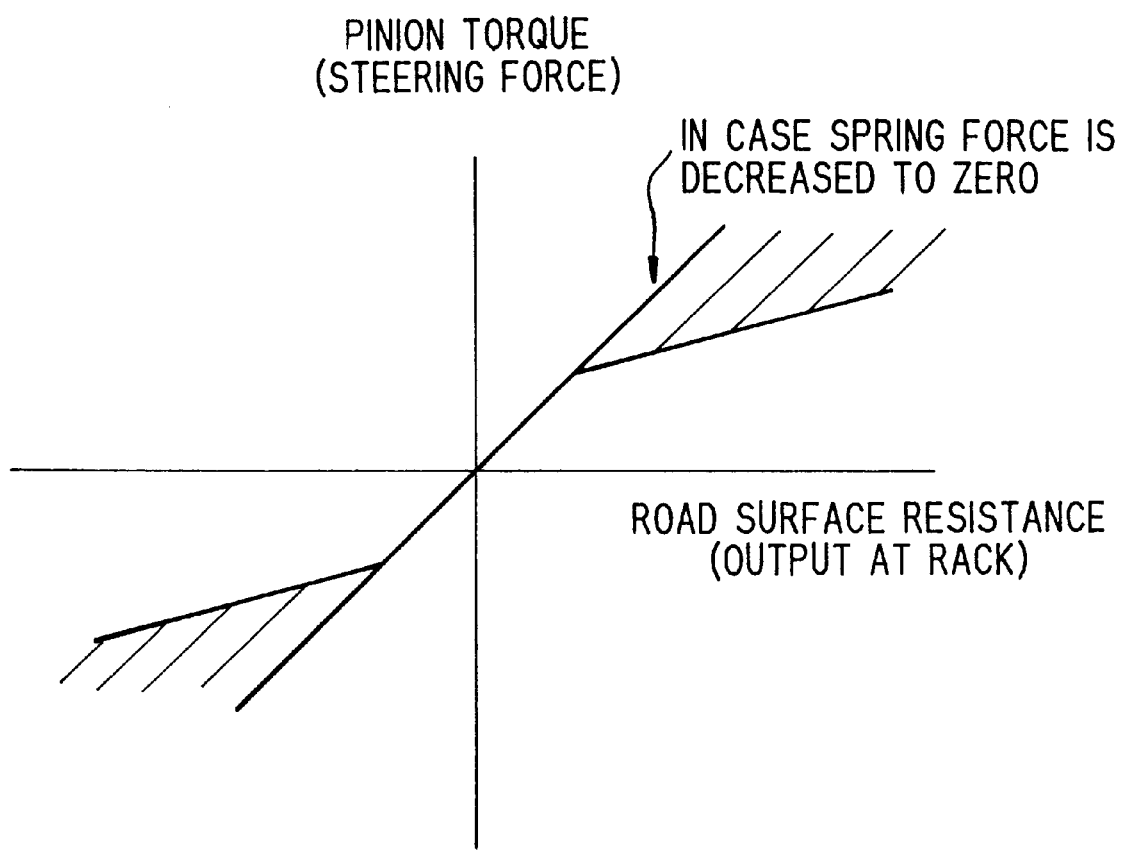
FIG. 14 is a graph showing the steering characteristics obtained in the system according to the third embodiment of the invention.

FIG. 14 illustrates the steering characteristics obtained in the system according the third embodiment.

Upon the operation of the pilot relief valve 140, the steering force is defined by one of four thin lines which are in parallel with the thick line indicating the muscular-energy steering characteristic. Depending on how much the servo motor 142 relieves the spring, the steering characteristics will be defined by any of the thin lines. If the spring is relieved the spring such that the spring force is decreased to zero, the steering force characteristics will be the same as those of the muscular-energy steering system. Needless to say, the number of the thin lines are an example and are not exhaustive.

Since the third embodiment is configured to decrease the amount of power-assist, no automatic steering will accordingly be carried out. However, there will be a situation that not to steer right or left would yield a good result. For example, other vehicles are about to overtake or pass the subject vehicle in both the right and left lanes and what is worse, there is an obstacle in front of the subject vehicle. In that instance, the system can be configured to make the actuating force at the steering wheel greater in both the right and left directions so as to suggest to the driver to continue the straight-ahead steering or at least to keep the current lane.

Advantageously, since the relief valve 140 is a pilot valve in the third embodiment, the output of the servo motor 142 can be small, thereby rendering the system configuration small and less space is needed. Since the steering mechanism is usually fitted in a relatively narrow space, it is advantageous if the system configuration can be small. The rest of the advantages and effects of the third embodiment are the same as in the second embodiment.

Figure 15:
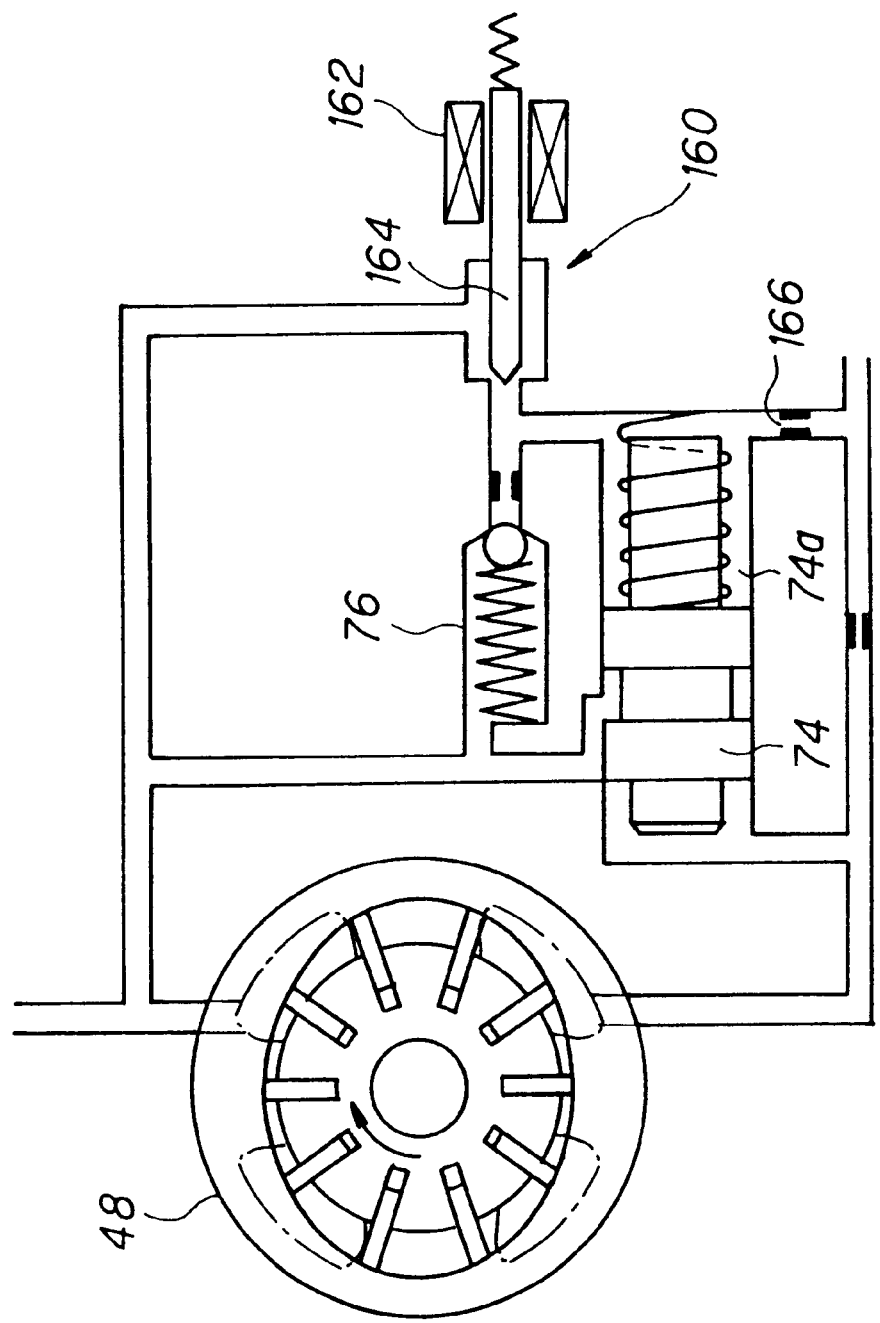
FIG. 15 is a view, similar to FIG. 12, but showing the system for correcting the steering force of a vehicle according to a fourth embodiment of the invention.

FIG. 15 is a view, similar to FIG. 12, but showing the system according to a fourth embodiment of the invention.

Whereas the hydraulic pressure is regulated at any level in the third embodiment, the pressure is ON-OFF (two-level) controlled in the fourth embodiment using a solenoid valve 160. Specifically, when the CPU 2 determines that the power-assist should preferably be decreased to a lower value or to zero, the CPU 2 supplies current to the solenoid 162 to open a poppet valve 164.

As a result, the hydraulic oil in the right chamber 74a of the flow control valve 74 is relieved and the pressure is lowered. The valve 74 is accordingly shifted right to return the hydraulic oil to the oil reservoir. The maximum pressure in the circuit is thus determined by the differential pressure, which then determines the marginal amount of power-assist. The differential pressure is determined by the opening degree of a restrictor 166 inserted in the circuit. The steering characteristics will be those defined by one of the thin lines shown in FIG. 14. The usual hydraulic pressure may be zero depending on the design of the restrictor 166, rendering the characteristics the same as those of muscular-energy steering systems.

The system of the fourth embodiment can only vary the amount of power-assist, and can not create the automatic steering. However, the system according to the fourth embodiment can make the steering force actuating force greater in the right and left directions, it can have the same effect as the third embodiment. Since it uses the pilot relief valve similar to the third embodiment, the valve can be made small, rendering electric current consumption low. The rest of the advantages and effects of the fourth embodiment are the same as in the second embodiment.

Figure 16:
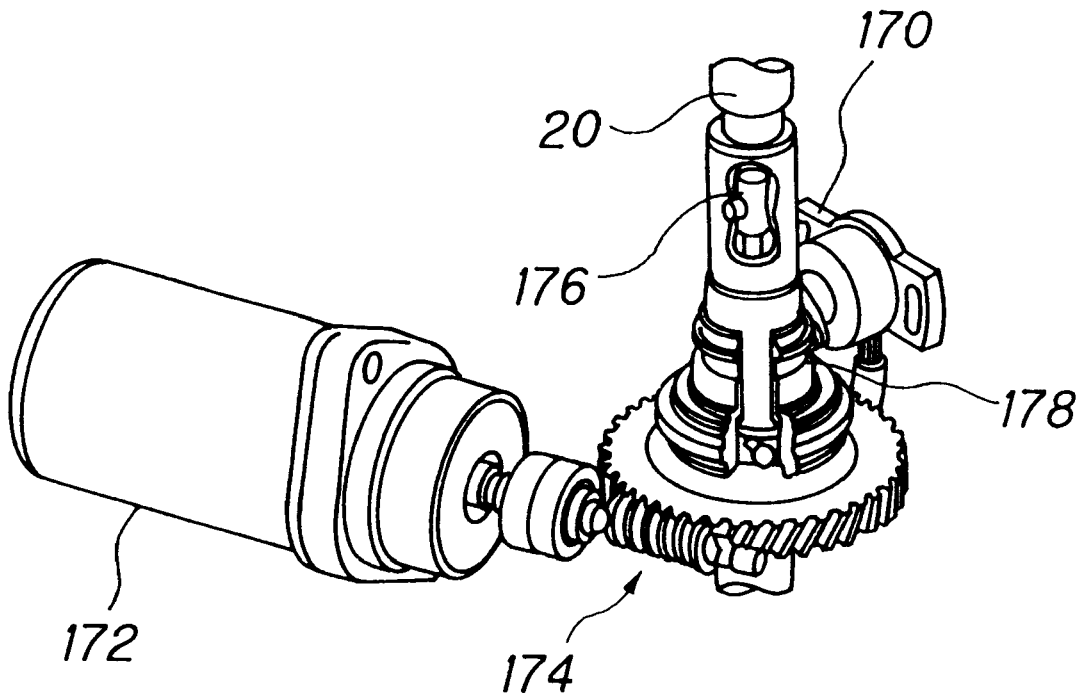
FIG. 16 is an explanatory perspective view showing a portion of an electric power-assist steering system in which the system for correcting the steering force of a vehicle according to a fifth embodiment of the invention is incorporated.

FIG. 16 is an explanatory perspective view showing the system according to a fifth embodiment of the invention. The system is embodied in an electric power-assisted steering system that uses no hydraulic energy.

Explaining the system with reference to FIG. 16, the system comprises a torque sensor (potentiometer) 170, an electric motor 172 which is controlled to drive the steering shaft 20 based on the detected torque, a speed reducer 174 made of a worm gear that reduces output speed of the motor 172 to intensify the torque. The components are assembled as a unit and attached to the steering shaft 20. Although not shown, an ordinary rack and pinion steering is provided at the bottom of the assembly. The configuration disclosed in the figure is, however, known and the characteristic feature of the invention does not reside therein.

Figure 17:
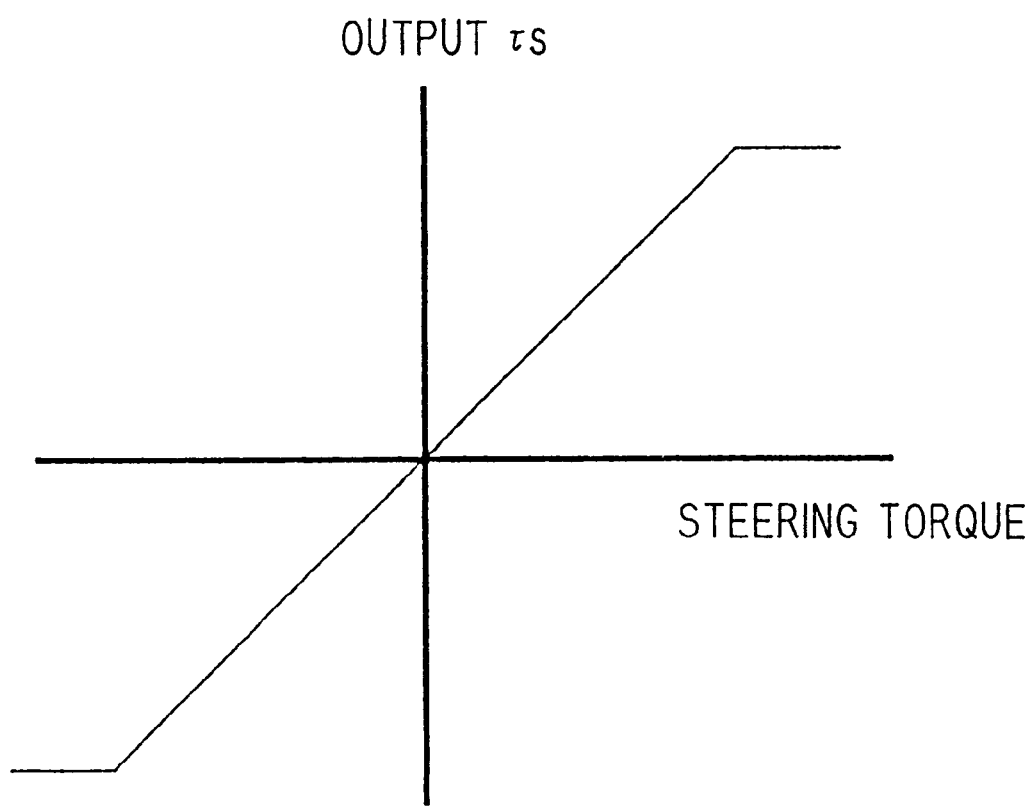
FIG. 17 is a graph showing the output characteristics of a torque sensor illustrated in FIG. 16.
Figure 18:
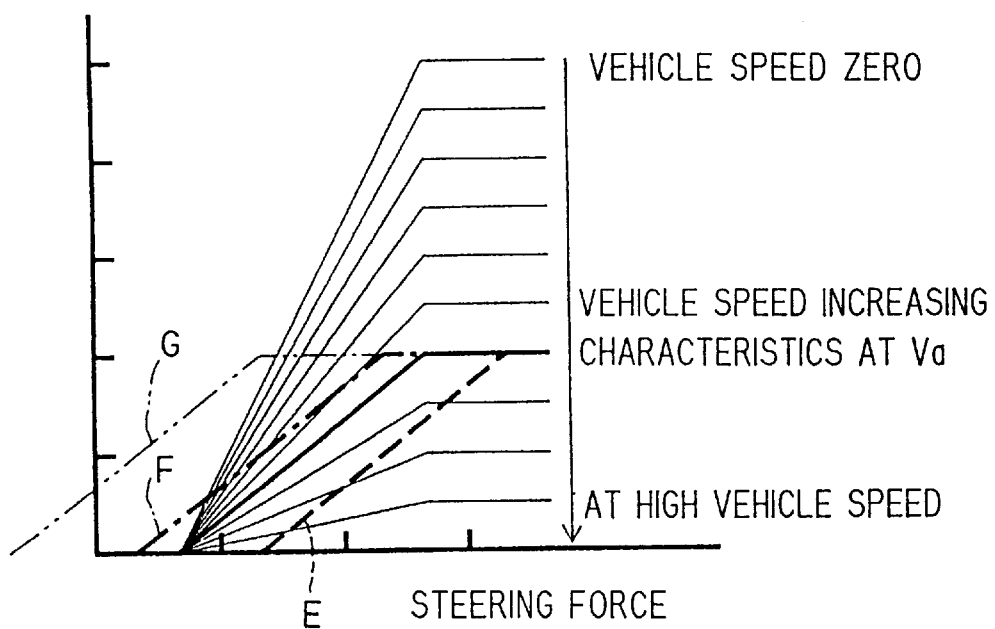
FIG. 18 is a graph showing the characteristics of current of the electric motor illustrated in FIG. 16 with respect to the steering force.
Figure 19:
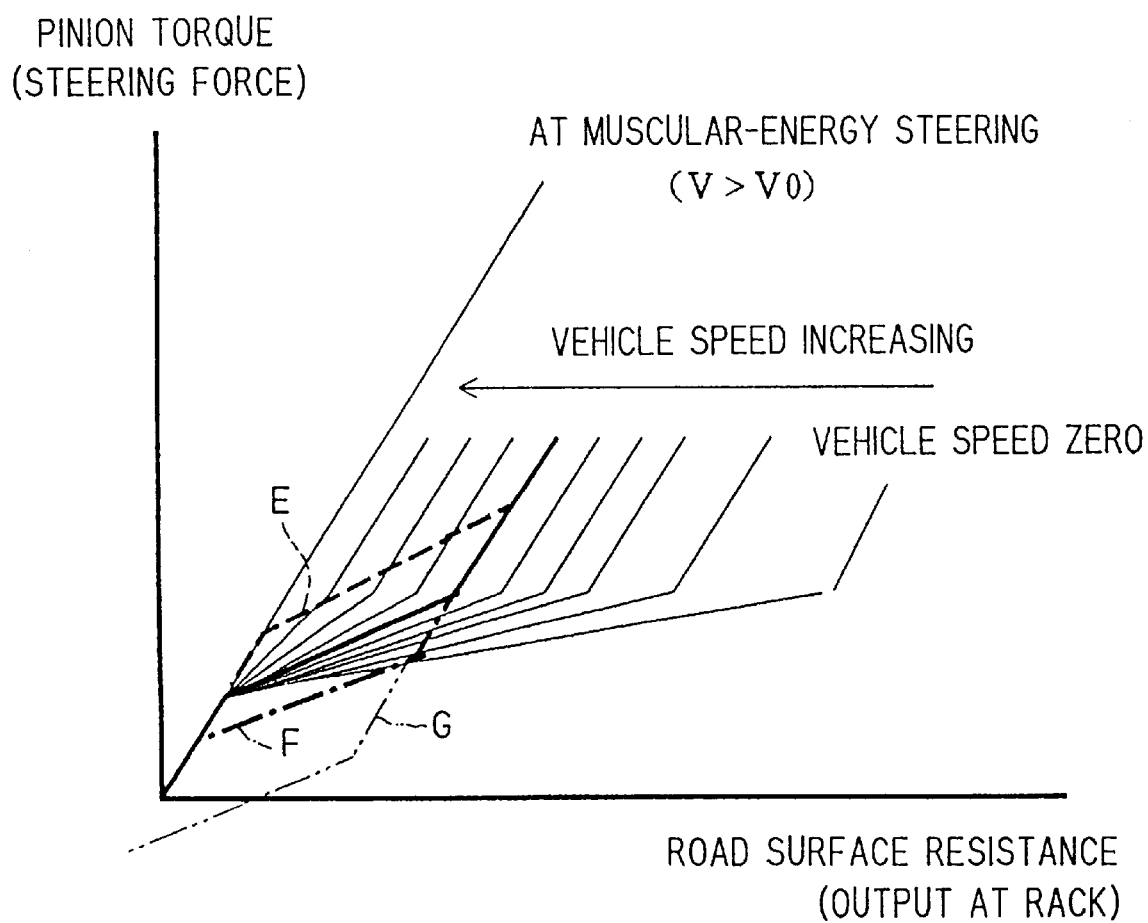
FIG. 19 is a graph showing the steering characteristics obtained in the system according to the fifth embodiment of the invention.

In the system according to the invention, when actuating force is exerted on the steering wheel 18, a torsion bar 176 is twisted. The twist is translated through a cam (not shown) into the up-and-down motion of a slider 178 and the motion is detected by the torque sensor (potentiometer) 170. The slider 178 thus moves up or down in response to the magnitude and direction of the actuating force (steering force) exerted on the steering wheel 18. The characteristics of the torque sensor 170 are basically linear as illustrated in FIG. 17. The CPU 2 receives the outputs of the torque sensor and vehicle speed sensor, and determines and outputs a command indicative of the amount of current to be supplied to the electric power-assist motor 172 in response to the steering force, as illustrated in FIG. 18. The steering characteristics obtained in the system will similarly be variable in response to the vehicle speed as shown in FIGS. 18 and 19. The above is also known in the art.

Figure 20:
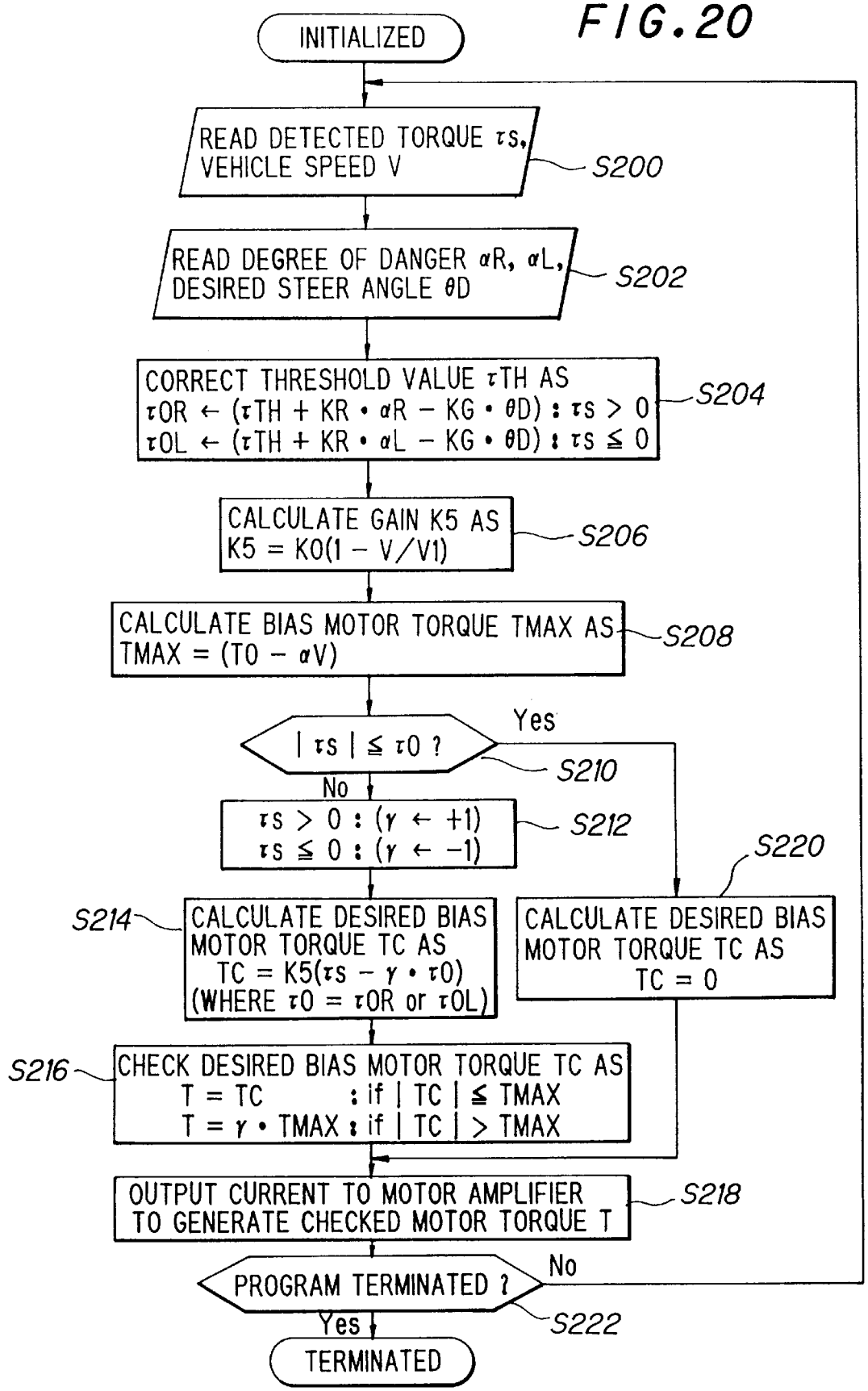
FIG. 20 is a flowchart showing the operation of the system according to the fifth embodiment of the invention.

FIG. 20 is a flowchart showing the operation of the system according to the fifth embodiment of the invention.

Explaining this, in S200 the detected torque (or steering force) τs and the vehicle speed V are read. The detected torque τs is the value obtained based on the torque sensor 170 and is positive or negative depending on the direction of the steering wheel's rotary motion.

The program then goes to S202 in which the degrees of danger in the right and left directions $\alpha R$, $\alpha L$, and the desired steer angle $\theta D$ are read. Different from the second embodiment, the system in the fifth embodiment is configured to estimate the degree of danger respectively both in the right and left directions. More specifically, although the steering force is, for example, increased in the left direction in the second embodiment, increased both in the right and left directions in the third and fourth embodiments, the steering force is controlled in the fifth embodiment independently in the right and left directions.

The program then goes to S204 in which a threshold value τTH for determining whether power-assist should be initiated, is corrected by the desired steer angle $\theta D$ and the degree of danger in the right and left directions $\alpha L$ and $\alpha R$, where KR and KG are constants, to determine corrected threshold values τ0R, τ0L respectively in the right and left directions. The program then proceeds to S206 in which the ratio between the detected vehicle speed V and a predetermined vehicle speed V1 is calculated and the ratio is subtracted from 1.0. The difference is then multiplied by a basic value K0 to determine a gain K5. The gain is thus determined in such a manner that it decreases with increasing vehicle speed.

The program then goes to S208 in which the degree of dangers $\alpha R$, $\alpha L$ are respectively multiplied by the detected vehicle speed V and the products are respectively subtracted from the upper limit T0 to respectively obtain maximum torques TMAX for the right and left directions. Since the degree of danger is estimated individually in the right and left directions, the desired maximum torque is accordingly calculated separately for both the directions. The program then goes to S210 in which the absolute value of the detected torque τs is respectively compared with the threshold values τ0R and τ0L for the determination of power-assist initiation for the right and left directions and if it is found that the absolute value of the detected steering force exceeds one or both of the threshold values, the program goes to S212 in which it is determined whether the detected torque is positive or negative, i.e., the direction of the steering force is determined and a value γ is determined to be +1 or −1 in accordance with the determination.

The program then goes to S214 in which the value γ is multiplied by the threshold values τ0 respectively, and the difference between the product and the detected steering force τs is calculated and is multiplied by the gain K5 to determine a desired motor torque TC. Here, depending on the direction of the steering, either of the threshold values is multiplied by the value γ and is used in the desired motor torque determination. The program then proceeds to S216 in which the determined desired motor torque is compared with an upper limit TMAX to check and determine the output motor torque T. If the determined value is found to exceed the limit, the output torque is restricted to the limit, more precisely to a value obtained by multiplying the limit by the value γ.

The program then proceeds to S218 in which the current is output to the motor amplifier to generate the determined motor torque T. Thus the steering force is determined in response to the desired steer angle $\theta D$ and the degree of danger $\alpha R$, $\alpha L$, and is carried out by adjusting the amount of power-assist. Incidentally, when S210 finds that the absolute value of the detected steering force is not greater than the threshold values, the program proceeds to S220 in which the desired motor torque TC is determined to be zero.

The program then advances to S222 in which it is checked whether the program should be terminated and unless the result is affirmative, the program flows back to S200 and on to repeat the above procedures.

Having been described in the above, the system in the fifth embodiment is configured such that the threshold value is corrected by the desired steer angle and the degree of danger in the direction in which the vehicle is being steered, and the threshold value is then compared with the detected steering force (torque) to calculate the difference therebetween on the basis of which the amount of motor current is determined. The threshold value may be negative depending on the determination of the gain and in that instance, the steering force will be generated even when no steering torque is input, making it possible to create automatic steering. The system can therefore cope with cooperative steering of a human being (driver) and automatic steering based on the same algorithm similar to the foregoing embodiments.

The steering characteristics in the system of the fifth embodiment are explained with reference to FIGS. 18 and 19 in which the thick solid line (among thin solid lines) indicates a situation in which no steering force correction is performed while the vehicle is running at a speed Va, whereas the thick dashed line marked by E indicates the correction is performed such that the steering force is increased. On the other hand, the one-dot-chain line F indicates the case in which the steering force is decreased. If the characteristics are further shifted as shown by the two-dot-chain line G, the steering force will be minus, resulting in the occurrence of automatic steering.

Since, in the system of the fifth embodiment, the control algorithm can be altered by rewriting the software algorithm, the system can easily determine the amount of power-assist independently in the right and left directions. In addition, by changing the determination of the gain K5 in S206 in the flowchart of FIG. 20, it can easily modify the system such that the gain varies not only by the vehicle speed, but also by the degree of danger. In that case, the steering force can be changed in accordance with the characteristics disclosed in FIG. 19 in response to the degree of danger. For example, by altering the gain determination as:

$$K5 = K0(\alpha 0 - \alpha R)(\alpha 0 - \alpha L) \times (1 - V/V1)$$

(where $\alpha 0$ is a constant)

The gain will be smaller as the degree of danger increases, thereby decreasing the amount of power-assist. Explaining this in the characteristics shown in FIG. 19, the broken lines will become straighter toward the linear muscular-energy steering characteristic as the amount of power-assist decreases. In an extreme example, when the degree of danger in either of directions exceeds the constant $\alpha 0$, the gain K5 will be negative. As a result, the current will be beyond the value corresponding to the muscular-energy steering characteristics and the steering force will be heavier than that for the muscular-energy steering.

Being configured in the foregoing manner, the system according to the fifth embodiment can correct the steering force to be a proper value by predicting a future vehicle behavior or condition based on the state of the current vehicle running conditions in accordance with the concept of feedforward control, so as to allow the driver to correct the steering such that the behavior of the vehicle coincides with that which he expects, or by providing through the steering force the information about the danger which would otherwise occur due to a cause that the driver overlooked.

Moreover, the system predicts a future vehicle condition or behavior and provides it to the driver by making the steering force in the right or left direction different, and urges him to avoid a possible danger which would otherwise happen. In a vehicle equipped with power-assisted steering or power steering, the system can achieve the same effects by varying the amount of power-assist. Furthermore, the driver can not only maneuver at his discretion using all his senses, but also steer the vehicle optimally referring to the operation of the system. More specifically, the system is configured such that, when the driver's judgment and the steering force determined by the system is not the same, the driver can override the system operation. The system is further configured such that, when to steer right or left is found to be inappropriate, the steering force in the both directions are made greater in response to the degree of inappropriateness.

Thus, the system can be configured such that, the system determines the amount of steering optimum for the driver to steer the vehicle to run easily along the traffic lane. The system can thus provide the information to a human being (driver) as the steering force so as to coexist with him, and can further vary the degree of participation of a human being continually towards automatic steering where the human being does no longer participate in the driving.

Figure 21:
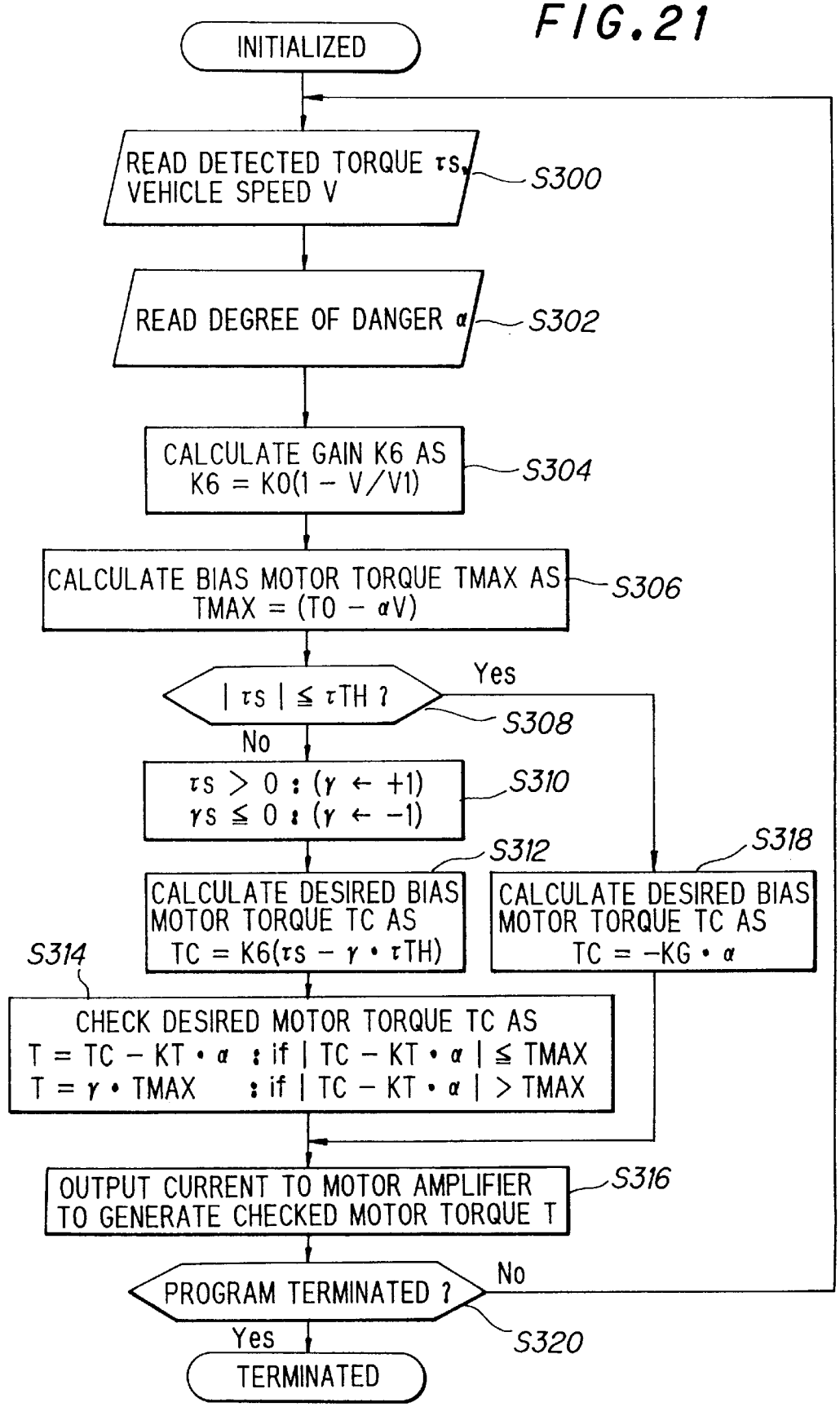
FIG. 21 is a flowchart showing the operation of the system for correcting the steering force of a vehicle according to a sixth embodiment of the invention.

FIG. 21 is a flowchart, similar to FIG. 20, but showing the operation of the system according to a sixth embodiment of the invention.

The configuration or structure of the system of the sixth embodiment is basically the same as that of the fifth embodiment. The system is different from that of the fifth embodiment in the operation or control algorithm. It is assumed in the system of the sixth embodiment that the degree of danger is equal in the right and left directions.

Explaining the operation of the system, the program moves from S300 to S312 in which the desired motor torque TC is calculated in a similar manner as the fifth embodiment, the program then goes to S314 in which the degree of danger $\alpha$ is multiplied by a gain KT and the product is subtracted from the calculated desired motor torque TC. The absolute value of the difference is then compared with the maximum torque TMAX. If it is found to be not greater than the maximum torque, the calculated difference is determined to be the output torque T and if not, the maximum torque is multiplied by $\gamma$ and the product is decided to be the output torque T.

Figure 22:
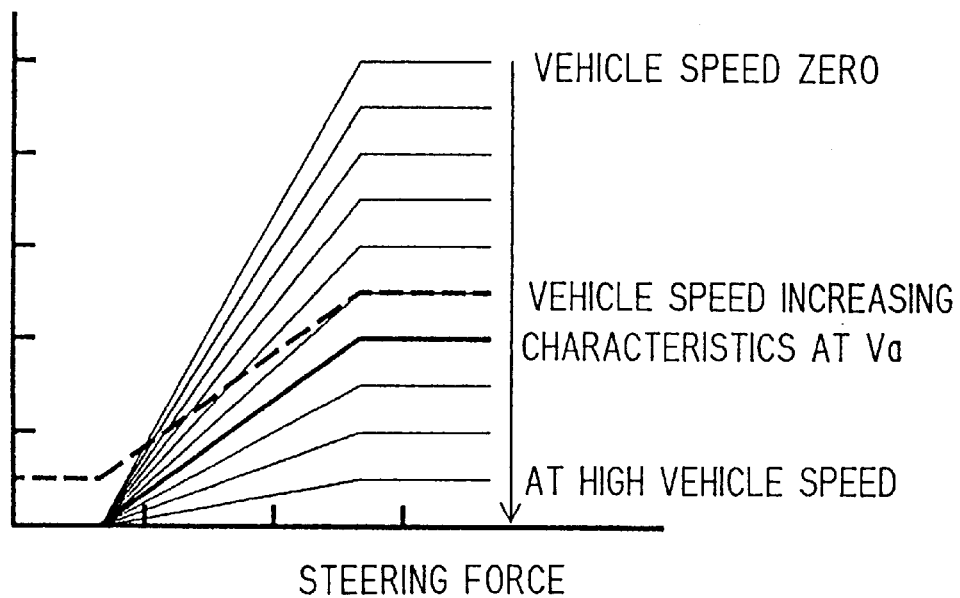
FIG. 22 is a graph showing the characteristics of current of the motor used in the system according to the sixth embodiment of the invention with respect to the steering force.
Figure 23:
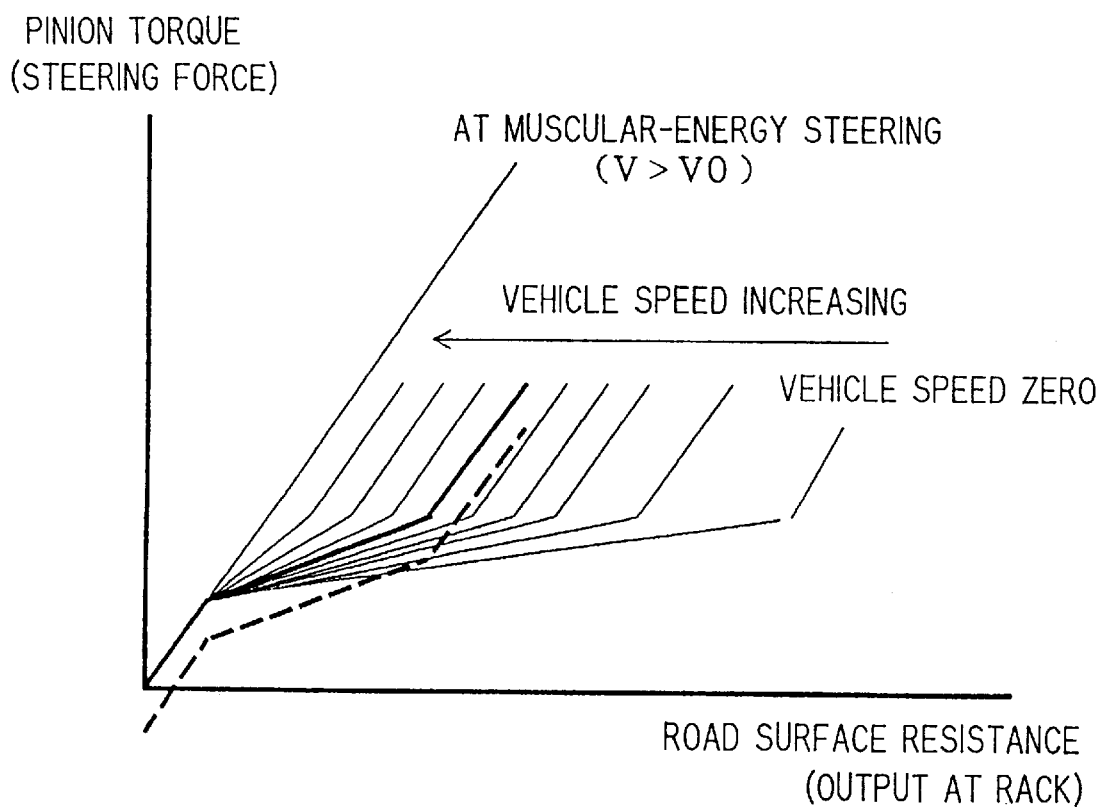
FIG. 23 is a graph showing the steering characteristics obtained in the system according to the sixth embodiment of the invention.

By comparison, the output torque is biased in the sixth embodiment, whereas the detected steering force is biased in the fifth embodiment, FIGS. 22 and 23, shown in a manner similar to FIGS. 18 and 19 of the fifth embodiment, illustrate the steering characteristics obtained in the system of the sixth embodiment. Assuming that the characteristics shown by the thick dashed line is given, the resistance of the road surface (output of the rack) occurs even when the steering force (pinion torque) is zero. This means that a slight bias signal can generate a minus steering force, i.e. a slight bias signal can cause the steering wheel to rotate by itself, in other words, it can create the automatic steering. The rest of the sixth embodiment is the same as that of the fifth embodiment.

It should be noted here that the control algorithm illustrated in FIG. 21 may be modified to read the desired steer angle θD in S302 and to have a step similar to S204 in FIG. 20 in the fifth embodiment. It is alternatively possible to modify the control algorithm, such as to determine the degree of danger differently in the right and left directions as is done in the fifth embodiment.

Thus, in each of the first to sixth embodiments, there is provided a system for correcting a steering force of a vehicle having a steering wheel (18) whose rotary motion exerted by a vehicle driver is converted into a turn motion of steered wheels (32) of the vehicle through a steering mechanism, comprising road condition detecting means (10) mounted on the vehicle for detecting a condition of a road ahead having at least one traffic lane on which the vehicle is traveling; position detecting means (64, CPU 1) for detecting a position of the vehicle with respect to the traffic lane based at least on an output of the road condition detecting means; steering force determining means (CPU 2) for determining a desired steering force to be generated by the steering mechanism necessary for keeping a desired position of the vehicle with respect to the traffic lane determined based at least on an output of the position detecting means; and biasing means (34, 46, 50, 90, 92, 142, 172) for biasing the steering mechanism such that the steering mechanism generates the desired steering force determined by the steering force determining means.

Moreover, there is provided a system for correcting a steering force of a vehicle having a steering wheel (18) whose rotary motion exerted by a vehicle driver is converted into a turn motion of steered wheels (32) of the vehicle through a steering mechanism, comprising road condition detecting means (10) mounted on the vehicle for detecting a condition of a road ahead having at least one traffic lane on which the vehicle is traveling; position detecting means (64, CPU 1) for detecting a position of the vehicle with respect to the lane based at least on an output of the road condition detecting means; steer angle determining means (CPU 2) for determining a desired steer angle (θD) necessary for keeping a desired position of the vehicle with respect to the traffic lane determined based at least on an output of the position detecting means; steering force detecting means (22, 24, 26, 28, 38, 170) for detecting a steering force applied through the steering wheel (18); power assisting means (46, 50, 172) for assisting at least a part of the steering force in accordance with a predetermined characteristic; and characteristic changing means (CPU 2) for changing the predetermined characteristic based on an output of the steer angle determining means. In the system, the characteristic changing means (CPU 2) includes biasing means (90, 92, 142, 172) for biasing the steering mechanisms such that the predetermined characteristic is changed based on an output of the steer angle determining means. The system further includes restricting means (96, 98) for restricting an amount of power-assist of the power assisting means.

Furthermore, there is provided a system for correcting a steering force of a vehicle having a steering wheel (18) whose rotary motion exerted by a vehicle driver is converted into a turn motion of steered wheels (32) of the vehicle through a steering mechanism, comprising obstacle detecting means (12) mounted on the vehicle for detecting an obstacle around the vehicle; danger degree estimating means (68) for estimating a degree of danger (α) based on an output of the obstacle detecting means when the vehicle is assumed to be steered in a direction where the obstacle is present; steering force detecting means (22, 24, 26,28, 38, 170) for detecting a steering force applied through the steering wheel (18); power assisting means (46, 50, 172) for assisting at least a part of the steering force in accordance with a predetermined characteristic based on an output of the steering force detecting means; and characteristic changing means (CPU 2) for changing the predetermined characteristic based at least on an output of the danger degree estimating means.

Furthermore, there is provided a system for correcting a steering force of a vehicle having a steering wheel (18) whose rotary motion exerted by a vehicle driver is converted into a turn motion of steered wheels (32) of the vehicle through a steering mechanism, comprising, obstacle detecting means (12) mounted on the vehicle for detecting an obstacle around the vehicle; danger degree estimating means (68) for estimating a degree of danger (α) based on an output of the obstacle detecting means when the vehicle is assumed to be steered in a direction where the obstacle is present; and biasing means (34, 90, 92, 142, 172) for biasing the steering mechanism such that the steering mechanism generates the steering force based at least on an output of the danger degree estimating means.

Furthermore, there is provided a system for correcting a steering force of a vehicle having a steering wheel (18) whose rotary motion exerted by a vehicle driver is converted into a turn motion of steered wheels (32) of the vehicle through a steering mechanism, comprising obstacle detecting means (12) mounted on the vehicle for detecting an obstacle around the vehicle; danger degree estimating means (68) for estimating a degree of danger (α) based on an output of the obstacle detecting means when the vehicle is assumed to be steered in a direction where the obstacle is present; vehicle deviation detecting means (CPU 1) for detecting a deviation of the vehicle (ΔL) from a reference line (M) in the traffic lane; and biasing means (34, 90, 92, 142, 172) for biasing the steering mechanism such that the steering mechanism generates a steering force based at least on outputs of the danger degree estimating means and the vehicle deviation detecting means. In the system, the biasing means is made inoperable when an output (ΔL) of the vehicle deviation detecting means is less than a predetermined value (L).

Furthermore, there is provided a system for correcting a steering force of a vehicle having a steering wheel (18) whose rotary motion exerted by a vehicle driver is converted into a turn motion of steered wheels (32) of the vehicle through a steering mechanism, comprising obstacle detecting means (12) mounted for detecting an obstacle around the vehicle; danger degree estimating means (68) for estimating a degree of danger (α) based on an output of the obstacle detecting means when the vehicle is assumed to be steered in a direction where the obstacle is present; vehicle angle detecting means (CPU 1) for detecting an inclinatory angle of a longitudinal axis of the vehicle (ΘV) with respect to the traffic lane; and biasing means (34, 90, 92, 142, 172) for biasing the steering mechanism such that the steering mechanism generates a steering force based at least on outputs of the danger degree estimating means and the vehicle angle detecting means. The system further includes vehicle deviation detecting means for detecting a deviation of the vehicle (ΔL) from a reference line (M) in the traffic lane and the biasing means is made inoperable when an output (ΔL) the detected deviation is less than a predetermined value (L).

In the above, the systems further includes traffic lane change detecting means (S4, S16) for detecting whether the vehicle has changed traffic lanes and the biasing means is made inoperable in response to at least an output of the traffic lane change detecting means.

In the above, the systems further include vehicle speed detecting means (16, S3, S14) for detecting a traveling speed of the vehicle (V) and the characteristic changing means is made inoperable in response to at least an output of the vehicle speed detecting means.

In the above, the systems further includes neutral position urging means (118, 120) for urging the biasing means (90, 92) to a neutral position that is corresponding to a straight-ahead position at the steering wheel.

It should be noted in the first to sixth embodiments, although the CCD camera and image processing unit are used to detect the road condition ahead of the vehicle, it is easily understood that information from a navigation system can be used in the invention. Since the information that the navigation system provides is insufficient and the technique to locate the vehicle is not so accurate, the image processing using the CCD camera disclosed in the foregoing embodiments is better in detecting the current road condition and position/direction of the vehicle on the current road condition or in predicting a future behavior of the vehicle. For that reason, the technique is used in the embodiments. It has been proposed by the Japanese authority to imbed magnetic markers along traffic lanes on the road to recognize it. If the technique will be available in future, the invention can be realized without using the image processing that is relatively expensive.

It should also be noted that, although a highway is taken as an example of the road, the invention should not be limited to this and is able to be carried out on an ordinary road if it has any lane marker.

It should be further noted that although the foregoing embodiments are mainly explained with a vehicle equipped with the power-assisted steering system, the invention can apply to a vehicle having a muscular-energy steering system.

It should further be noted that the torque sensor used in the fifth and sixth embodiments should not be limited to that disclosed, but any other type of sensors can be used.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for mounting on a vehicle for correcting a steering force of the vehicle having a steering wheel whose rotary motion exerted by a vehicle driver is converted into a turn motion of steered wheels of the vehicle through a steering mechanism, the system comprising:

road condition detecting means for detecting a condition of a road ahead having at least one traffic lane on which the vehicle is traveling;

position detecting means for detecting a position of the vehicle with respect to the traffic lane based at least on an output of the road condition detecting means;

steering force determining means for determining a desired steering force to be generated by the steering mechanism necessary for keeping a desired position of the vehicle with respect to the traffic lane determined based at least on an output of the position detecting means;

biasing means for biasing the steering mechanism such that the steering mechanism generates the desired steering force determined by the steering force determining means;

vehicle speed detecting means for detecting a present speed of the vehicle; and control means for causing said biasing means to generate said desired steering force when said present vehicle speed exceeds a predetermined minimum speed below which a traffic lane position deviation is not controlled by the system.

2. A system according to claim 1, wherein when the steering force determining means determines the desired steering force in a right or a left direction from the traffic lane on which the vehicle is traveling, the biasing means biases the steering mechanism such that the steering mechanism generates the desired steering force in the same direction.

3. A system according to claim 1, further including:

a yaw rate sensor mounted on the vehicle for detecting a yaw rate of the vehicle around a yaw axis thereof;

and the position detecting means detects the position of the vehicle based at least on the output of the road condition detecting means and an output of the yaw rate sensor.

4. A system for mounting on a vehicle for correcting a steering force of the vehicle having a steering wheel whose rotary motion exerted by a vehicle driver is converted into a turn motion of steered wheels of the vehicle through a steering mechanism, the system comprising:

road condition detecting means for detecting a condition of a road ahead having at least one traffic lane on which the vehicle is traveling;

position detecting means for detecting a position of the vehicle with respect to the lane based at least on an output of the road condition detecting means;

steering angle determining means for determining a desired steering angle necessary for keeping a desired position of the vehicle with respect to the traffic lane determined based at least on an output of the position detecting means;

steering force detecting means for detecting a steering force applied through the steering wheel;

power assisting means for assisting at least a part of the steering force in accordance with a predetermined characteristic;

characteristic changing means for changing the predetermined characteristic based on an output of the steering angle determining means;

vehicle speed detecting means for detecting a present speed of the vehicle; and control means for causing said power assisting means to assist said steering force when said present vehicle speed exceeds a predetermined minimum speed below which a traffic lane position deviation of the vehicle is not controlled by the system.

5. A system according to claim 4, further including:

a yaw rate sensor mounted on the vehicle for detecting a yaw rate of the vehicle around a yaw axis thereof;

and the position detecting means detects the position of the vehicle based at least on the output of the road condition detecting means and an output of the yaw rate sensor.

6. A system according to claim 4, wherein the characteristic changing means includes:

biasing means for biasing the steering mechanisms such that the predetermined characteristic is changed based on an output of the steer angle determining means.

7. A system according to claim 4, wherein when the steer angle determining means determines the steer angle in a right or left direction, the power assisting means increases an amount of power-assist in the same direction.

8. A system according to claim 5, wherein when the steer angle determining means determines the steer angle in a right or left direction, the power assisting means decreases an amount of power-assist in the opposite direction.

9. A system according to claim 6, wherein when the steer angle determining means determines the steer angle in a right or left direction, the power assisting means decreases an amount of power assist in the opposite direction.

10. A system according to claim 4, wherein the predetermined characteristic is such that, an amount of power-assist is zero or decreased when the detected steering force is less than a prescribed value, while the amount of power-assist is determined with reference to the steering force when the detected steering force is greater than the prescribed value.

11. A system according to claim 10, wherein the characteristic changing means changes the prescribed value.

12. A system according to claim 4, wherein the characteristic changing means changes the characteristic such that an output amount obtained with reference to an output of the determined steer angle is added to an output amount of power-assist to increase the steering force in a right or left direction.

13. A system according to claim 4, further including:
restricting means for restricting an amount of power-assist of the power assisting means.

14. A system according to claim 4, wherein the predetermined characteristic is such that, an amount of power-assist is increased with increasing detected steering force when the detected steering force exceeds a prescribed value, and the characteristic changing means changes the prescribed value to a negative value.

15. A system for mounting on a vehicle for correcting a steering force of the vehicle having a steering wheel whose rotary motion exerted by a vehicle driver is converted into a turn motion of steered wheels of the vehicle through a steering mechanism, the system comprising:
obstacle detecting means for detecting an obstacle around the vehicle;
danger degree estimating means for estimating a degree of danger based on an output of the obstacle detecting means when the vehicle is assumed to be steered in a direction where the obstacle is present;
image sensing means for detecting a traffic lane on which the vehicle is traveling;
steering angle determining means for determining a desired steering angle necessary for keeping a desired position of the vehicle with respect to the traffic lane detected by said image sensing means;
steering force detecting means for detecting a steering force applied through the steering wheel;
power assisting means for assisting at least a part of the steering force in accordance with a predetermined characteristic based on outputs of the steering angle determining means and the steering force detecting means; and
characteristic changing means for changing the predetermined characteristic based at least on an output of the danger degree estimating means.

16. A system according to claim 15, wherein the characteristic changing means changes the characteristic such that an amount of power-assist is decreased at least in the direction in which the obstacle is present in response to at least an output of the danger degree estimating means.

17. A system for mounting on a vehicle for correcting a steering force of the vehicle having a steering wheel whose rotary motion exerted by a vehicle driver is converted into a turn motion of steered wheels of the vehicle through a steering mechanism, comprising:
obstacle detecting means for detecting an obstacle around the vehicle;
danger degree estimating means for estimating a degree of danger based on an output of the obstacle detecting means when the vehicle is assumed to be steered in a direction where the obstacle is present;
image sensing means for detecting a traffic lane on which the vehicle is traveling;
steering angle determining means for determining a desired steering angle necessary for keeping a desired position of the vehicle with respect to the traffic lane detected by said image sensing means; and
biasing means for biasing the steering mechanism such that the steering mechanism generates a desired steering force based on outputs of the danger degree estimating means and the steering angle determining means.

18. A system for mounting on a vehicle for correcting a steering force of the vehicle having a steering wheel whose rotary motion exerted by a vehicle driver is converted into a turn motion of steered wheels of the vehicle through a steering mechanism, the system comprising:
obstacle detecting means for detecting an obstacle around the vehicle while the vehicle is traveling in a traffic lane of a road;
danger degree estimating means for estimating a degree of danger based on an output of the obstacle detecting means when the vehicle is assumed to be steered in a direction where the obstacle is present;
vehicle deviation detecting means for detecting a deviation of the vehicle from a reference line in the traffic lane; and
biasing means for biasing the steering mechanism such that the steering mechanism generates a steering force based at least on outputs of the danger degree estimating means, the vehicle deviation detecting means and the obstacle detecting means.

19. A system according to claim 18, wherein the biasing means is made inoperable when an output of the vehicle deviation detecting means is less than a predetermined value.

20. A system for mounting on a vehicle for correcting a steering force of the vehicle having a steering wheel whose rotary motion exerted by a vehicle driver is converted into a turn motion of steered wheels of the vehicle through a steering mechanism, the system comprising:
obstacle detecting means for detecting an obstacle around the vehicle while the vehicle is traveling in a traffic lane on a road;
danger degree estimating means for estimating a degree of danger based on an output of the obstacle detecting means when the vehicle is assumed to be steered in a direction where the obstacle is present;
vehicle angle detecting means for detecting an inclinatory angle of a longitudinal axis of the vehicle with respect to the traffic lane; and
biasing means for biasing the steering mechanism such that the steering mechanism generates a steering force based at least on outputs of the danger degree estimating means and the vehicle angle detecting means.

21. A system according to claim 20, further including:
vehicle deviation detecting means for detecting a deviation of the vehicle from a reference line in the traffic lane; and
the biasing means is made inoperable when an output the detected deviation is less than a predetermined value.

22. A system according to claim 1, further including:
traffic lane change detecting means for detecting whether the vehicle has changed traffic lanes; and
the biasing means is made inoperable in response to at least an output of the traffic lane change detecting means.

23. A system for mounting on a vehicle for correcting a steering force of the vehicle having a steering wheel whose rotary motion exerted by a vehicle driver is converted into a turn motion of steered wheels of the vehicle through a steering mechanism, the system comprising:

- road condition detecting means for detecting a condition of a road ahead having at least one traffic lane on which the vehicle is traveling;
- position detecting means for detecting a position of the vehicle with respect to the lane based at least on an output of the road condition detecting means;
- steering angle determining means for determining a desired steering angle necessary for keeping a desired position of the vehicle with respect to the traffic lane determined based at least on an output of the position detecting means;
- steering force detecting means for detecting a steering force applied through the steering wheel;
- power assisting means for assisting at least a part of the steering force in accordance with a predetermined characteristic;
- characteristic changing means for changing the predetermined characteristic based on an output of the steering angle determining means;
- traffic lane change detecting means for detecting whether the vehicle has changed traffic lanes; and
- the characteristic changing means is made inoperable in response to at least an output of the traffic lane change detecting means.

24. A system for mounting on a vehicle for correcting a steering force of the vehicle having a steering wheel whose rotary motion exerted by a vehicle driver is converted into a turn motion of steered wheels of the vehicle through a steering mechanism, the system comprising:

- obstacle detecting means for detecting an obstacle around the vehicle;
- danger degree estimating means for estimating a degree of danger based on an output of the obstacle detecting means when the vehicle is assumed to be steered in a direction where the obstacle is present;
- steering force detecting means for detecting a steering force applied through the steering wheel;
- power assisting means for assisting at least a part of the steering force in accordance with a predetermined characteristic based on an output of the steering force detecting means; and
- characteristic changing means for changing the predetermined characteristic based at least on an output of the danger degree estimating means;
- traffic lane change detecting means for detecting whether the vehicle has changed traffic lanes; and
- the characteristic changing means is made inoperable in response to at least an output of the traffic lane change detecting means.

25. A system for mounting on a vehicle for correcting a steering force of the vehicle having a steering wheel whose rotary motion exerted by a vehicle driver is converted into a turn motion of steered wheels of the vehicle through a steering mechanism comprising:

- obstacle detecting means for detecting an obstacle around the vehicle;
- danger degree estimating means for estimating a degree of danger based on an output of the obstacle detecting means when the vehicle is assumed to be steered in a direction where the obstacle is present;
- biasing means for biasing the steering mechanism such that the steering mechanism generates the steering force based at least on an output of the danger degree estimating means;
- traffic lane change detecting means for detecting whether the vehicle has changed traffic lanes; and
- the biasing means is made inoperable in response to at least an output of the traffic lane change detecting means.

26. A system according to claim 18, further including:

- traffic lane change detecting means for detecting whether the vehicle has changed traffic lanes; and
- the biasing means is made inoperable in response to at least an output of the traffic lane change detecting means.

27. A system according to claim 20, further including:

- traffic lane change detecting means for detecting whether the vehicle has changed traffic lanes; and
- the biasing means is made inoperable in response to at least an output of the traffic lane change detecting means.

28. A system according to claim 1, further including:

- vehicle speed detecting means for detecting a traveling speed of the vehicle; and
- the biasing means is made inoperable in response to at least an output of the vehicle speed detecting means.

29. A system for mounting on a vehicle for correcting a steering force of the vehicle having a steering wheel whose rotary motion exerted by a vehicle driver is converted into a turn motion of steered wheels of the vehicle through a steering mechanism, the system comprising:

- road condition detecting means for detecting a condition of a road ahead having at least one traffic lane on which the vehicle is traveling;
- position detecting means for detecting a position of the vehicle with respect to the lane based at least on an output of the road condition detecting means;
- steering angle determining means for determining a desired steering angle necessary for keeping a desired position of the vehicle with respect to the traffic lane determined based at least on an output of the position detecting means;
- steering force detecting means for detecting a steering force applied through the steering wheel;
- power assisting means for assisting at least a part of the steering force in accordance with a predetermined characteristic;
- characteristic changing means for changing the predetermined characteristic based on an output of the steering angle determining means;
- vehicle speed detecting means for detecting a traveling speed of the vehicle; and
- the characteristic changing means is made inoperable in response to at least an output of the vehicle speed detecting means.

30. A system for mounting on a vehicle for correcting a steering force of the vehicle having a steering wheel whose rotary motion exerted by a vehicle driver is converted into a turn motion of steered wheels of the vehicle through a steering mechanism, the system comprising:

- obstacle detecting means for detecting an obstacle around the vehicle;
- danger degree estimating means for estimating a degree of danger based on an output of the obstacle detecting means when the vehicle is assumed to be steered in a direction where the obstacle is present;

steering force detecting means for detecting a steering force applied through the steering wheel;

power assisting means for assisting at least a part of the steering force in accordance with a predetermined characteristic based on an output of the steering force detecting means; and characteristic changing means for changing the predetermined characteristic based at least on an output of the danger degree estimating means;

vehicle speed detecting means for detecting a traveling speed of the vehicle; and the characteristic changing means is made inoperable in response to at least an output of the vehicle speed detecting means.

31. A system for mounting on a vehicle for correcting a steering force of the vehicle having a steering wheel whose rotary motion exerted by a vehicle driver is converted into a turn motion of steered wheels of the vehicle through a steering mechanism, comprising:

obstacle detecting means for detecting an obstacle around the vehicle;

danger degree estimating means for estimating a degree of danger based on an output of the obstacle detecting means when the vehicle is assumed to be steered in a direction where the obstacle is present;

biasing means for biasing the steering mechanism such that the steering mechanism generates the steering force based at least on an output of the danger degree estimating means;

vehicle speed detecting means for detecting a traveling speed of the vehicle; and the biasing means is made inoperable in response to at least an output of the vehicle speed detecting means.

32. A system according to claim 18, further including:

vehicle speed detecting means for detecting a traveling speed of the vehicle; and the biasing means is made inoperable in response to at least an output of the vehicle speed detecting means.

33. A system according to claim 20, further including:

vehicle speed detecting means for detecting a traveling speed of the vehicle; and the biasing means is made inoperable in response to at least an output of the vehicle speed detecting means.

34. A system for mounting on a vehicle for correcting a steering force of the vehicle having a steering wheel whose rotary motion exerted by a vehicle driver is converted into a turn motion of steered wheels of the vehicle through a steering mechanism, the system comprising:

road condition detecting means for detecting a condition of a road ahead having at least one traffic lane on which the vehicle is traveling;

position detecting means for detecting a position of the vehicle with respect to the traffic lane based at least on an output of the road condition detecting means;

steering force determining means for determining a desired steering force to be generated by the steering mechanism necessary for keeping a desired position of the vehicle with respect to the traffic lane determined based at least on an output of the position detecting means;

biasing means for biasing the steering mechanism such that the steering mechanism generates the desired steering force determined by the steering force determining means; and neutral position urging means for urging the biasing means to a neutral position that is corresponding to a straight-ahead position of the steering wheel.

35. A system for mounting on a vehicle for correcting a steering force of the vehicle having a steering wheel whose rotary motion exerted by a vehicle driver is converted into a turn motion of steered wheels of the vehicle through a steering mechanism, the system comprising:

obstacle detecting means for detecting an obstacle around the vehicle;

danger degree estimating means for estimating a degree of danger based on an output of the obstacle detecting means when the vehicle is assumed to be steered in a direction where the obstacle is present;

steering force detecting means for detecting a steering force applied through the steering wheel;

power assisting means for assisting at least a part of the steering force in accordance with a predetermined characteristic based on an output of the steering force detecting means;

characteristic changing means for changing the predetermined characteristic based at least on an output of the danger degree estimating means; and neutral position urging means for urging the biasing means to a neutral position that is corresponding to a straight-ahead position of the steering wheel.

36. A system according to claim 18, further including:

neutral position urging means for urging the biasing means to a neutral position that is corresponding to a straight-ahead position of the steering wheel.

37. A system according to claim 20, further including:

neutral position urging means for urging the biasing means to a neutral position that is corresponding to a straight-ahead position of the steering wheel.

38. A system for mounting on a vehicle having a steering wheel whose rotary motion exerted by a vehicle driver is converted into a turn motion of steered wheels of the vehicle through an electric motor, the system comprising;

torque detecting means for detecting a torque applied by a vehicle driver;

desired motor torque determining means for determining a desired motor torque based at least on an output of the torque detecting means;

obstacle detecting means for detecting an obstacle around the vehicle;

danger degree estimating means for estimating a degree of danger based on an output of the obstacle detecting means when the vehicle is assumed to be steered in a direction where the obstacle is present;

desired motor torque correcting means for correcting the desired motor torque based on an output of the danger degree estimating means; and motor current supplying means for supplying a current to the electric motor to generate the corrected motor torque.

* * * * *